US009072017B2

(12) United States Patent
Nakamura

(10) Patent No.: US 9,072,017 B2
(45) Date of Patent: Jun. 30, 2015

(54) WIRELESS STATION, SEMICONDUCTOR DEVICE, WIRELESS COMMUNICATION SYSTEM, AND A METHOD FOR CONTROLLING THE SAME

(71) Applicant: SOCIONEXT INC., Yokohama, Kanagawa (JP)

(72) Inventor: Tadashi Nakamura, Yokohama (JP)

(73) Assignee: FUJITSU SEMICONDUCTOR LIMITED, Yokohama (JP)

( * ) Notice: Subject to any disclaimer, the term of this patent is extended or adjusted under 35 U.S.C. 154(b) by 0 days.

(21) Appl. No.: 14/035,331

(22) Filed: Sep. 24, 2013

(65) Prior Publication Data

US 2014/0087740 A1 Mar. 27, 2014

(30) Foreign Application Priority Data

Sep. 26, 2012 (JP) ................................. 2012-212387

(51) Int. Cl.
*H04W 36/00* (2009.01)
*H04W 36/04* (2009.01)
*H04W 36/14* (2009.01)
*H04W 76/04* (2009.01)

(52) U.S. Cl.
CPC .............. *H04W 36/04* (2013.01); *H04W 36/14* (2013.01); *H04W 76/046* (2013.01)

(58) Field of Classification Search
CPC ..... H04W 36/04; H04W 36/06; H04W 36/08; H04W 36/10; H04W 36/12; H04W 36/24; H04W 36/36; H04W 76/045; H04W 76/046; H04W 36/00
USPC ........... 455/434, 435.2, 435.3, 436, 437, 438, 455/439, 445, 444, 446, 447
See application file for complete search history.

(56) References Cited

U.S. PATENT DOCUMENTS

| | | | | |
|---|---|---|---|---|
| 7,013,162 B2 * | 3/2006 | Gorsuch | | 455/553.1 |
| 7,260,424 B2 * | 8/2007 | Schmidt | | 455/575.7 |
| 7,907,929 B2 * | 3/2011 | Matsuda | | 455/343.5 |
| 8,423,078 B2 * | 4/2013 | Kim et al. | | 455/552.1 |
| 8,565,818 B1 * | 10/2013 | Bertz et al. | | 455/557 |
| 2005/0190782 A1 * | 9/2005 | Buckley et al. | | 370/437 |
| 2007/0171882 A1 * | 7/2007 | Lee | | 370/338 |
| 2014/0140319 A1 * | 5/2014 | Doetsch et al. | | 370/330 |

FOREIGN PATENT DOCUMENTS

| | | |
|---|---|---|
| JP | 2007-300420 | 11/2007 |
| JP | 2008-278050 | 11/2008 |
| JP | 2011-250173 | 12/2011 |

* cited by examiner

*Primary Examiner* — Jean Gelin
(74) *Attorney, Agent, or Firm* — Staas & Halsey LLP

(57) ABSTRACT

A wireless station includes a first wireless communication circuit, a second wireless communication circuit, and a control circuit. The first wireless communication circuit communicates by a first wireless communication system in a first cell which includes a first service area, and the second wireless communication circuit communicates by a second wireless communication system in a second cell which includes a second service area narrower than the first service area. The control circuit switches a communication system between the first wireless communication system and the second wireless communication system to control communication. When switching the communication system between the first wireless communication system and the second wireless communication system, the control circuit controls the first wireless communication circuit and the second wireless communication circuit to set a communication system which is used before the switching to an idle.

20 Claims, 30 Drawing Sheets

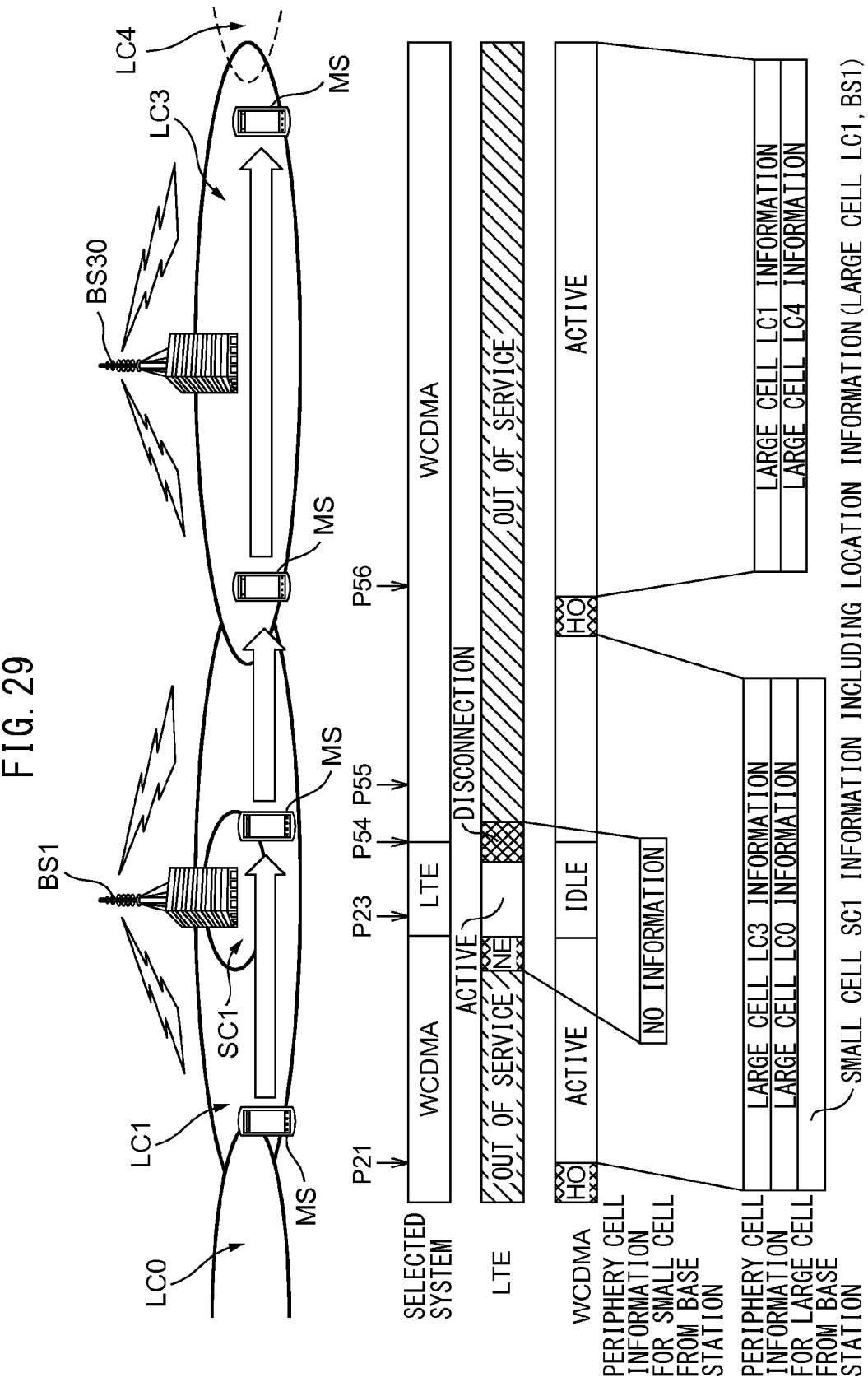

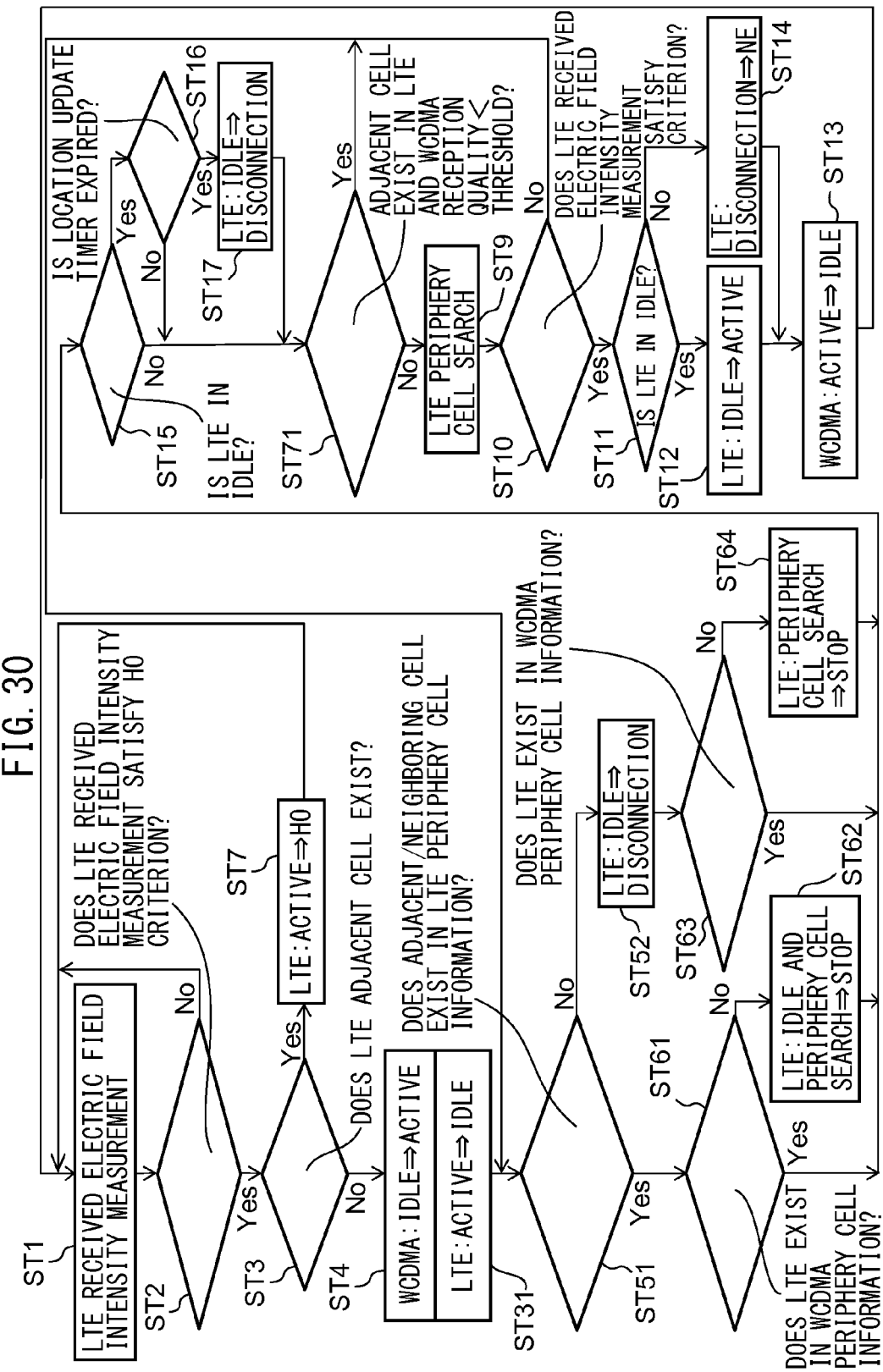

WIRELESS STATION, SEMICONDUCTOR DEVICE, WIRELESS COMMUNICATION SYSTEM, AND A METHOD FOR CONTROLLING THE SAME

CROSS-REFERENCE TO RELATED APPLICATION

This application is based upon and claims the benefit of priority of the prior Japanese Patent Application No. 2012-212387, filed on Sep. 26, 2012, the entire contents of which are incorporated herein by reference.

FIELD

The embodiments discussed herein are related to a wireless station, a semiconductor device, a wireless communication system, and a method for controlling the same.

BACKGROUND

In recent years, a mobile terminal which continues data communications (communications) while switching between a narrow area communication system (small cell) such as LTE (Long Term Evolution) and a wide area communication system such as WCDMA (Wideband Code Division Multiplexing Access) (large cell) has been put in practical use.

Such narrow area communication system which has narrow service area is not limited to LTE, and includes various communication systems, such as WiMAX (Worldwide Interoperability for Microwave Access), for example.

Moreover, such wide area communication system which has wide service area is not limited to WCDMA, and includes various communication systems, such as CDMA 2000, GPRS (General Packet Radio Service) or GSM (registered trademark) (Global System for Mobile Communications).

On the other hand, regarding a mobile terminal (portable mobile terminal) including a smartphone, a terminal communicating by, for example, switching the usable wireless communication systems in a service area in which the mobile terminal is located have become mainstream.

In the present specification, a mobile terminal includes various devices which may perform wireless communications, such as not only a smartphone and a mobile phone but also PDA (Personal Digital Assistants), a game machine, a notebook computer, a tablet and so on.

In the present specification, the wide area communication system and the narrow area communication system only present relative largeness of service areas (cells), and LTE and WiMAX are also regarded as a wide area communication system against a communication system based on femtocells which have smaller service areas, for example.

As mentioned above, communication of a mobile terminal is performed by, for example, switching the usable wireless communication systems in a service area in which the mobile terminal is located. For example, the communication is performed by switching to the cheapest and high-speed wireless communication system in the service area in which the mobile terminal is located.

A mobile terminal connects and disconnects wireless communication systems when the mobile terminal switches between wireless communication systems. Wireless (Radio) resource used by such switching may be very large, and this has a large influence on the number of accommodation user and a throughput. Further, using a plurality of wireless communication systems causes an increase of power consumption of a mobile terminal.

In other words, switching between the wireless communication systems to be used for communication by a mobile terminal causes an increase of network load for such switching process, and causes a drop of a connection rate and a throughput capable of being provided to a user. Further, for example a mobile terminal searches periphery cells outside service area, and this causes an increase of the power consumption.

In this regard, in the past, for example, a wireless communication terminal which shortens the period for a returning process into a service area, and may contribute to power-saving is proposed.

Patent Document 1: Japanese Laid-open Patent Publication No. 2008-278050

SUMMARY

According to an aspect of the embodiments, a wireless station includes a first wireless communication circuit configured to communicate by a first wireless communication system in a first cell which includes a first service area; a second wireless communication circuit configured to communicate by a second wireless communication system in a second cell which includes a second service area narrower than the first service area; and a control circuit configured to switch a communication system between the first wireless communication system and the second wireless communication system to control communication, wherein when switching the communication system between the first wireless communication system and the second wireless communication system, the control circuit controls the first wireless communication circuit and the second wireless communication circuit to set a communication system which is used before the switching to an idle.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 29 is a drawing (fourth) for describing the seventh embodiment of the control method of the wireless communication system; and FIG. 30 is a flowchart for describing an example of processes of the control method of the wireless communication system in the seventh embodiment depicted in FIG. 26 to FIG. 29.

DESCRIPTION OF EMBODIMENTS

First, before describing embodiments of a wireless station, a semiconductor device, a wireless communication system, and a method for controlling the same in detail, description will be made for a case in which a mobile terminal switches wireless communication systems and problems at the switching with reference to FIG. 1 and FIG. 2.

The data communication (communication) of a mobile terminal (MS) is performed while switching usable wireless communication systems in a service area in which the mobile terminal MS is located, for example. In other words, at the service area in which the mobile terminal MS is located, communication may be made by switching to a cheapest and high-speed wireless communication system, for example.

The present specification uses LTE and WiMAX as examples of a narrow area communication system (small cell), and uses WCDMA, CDMA2000, GPRS, and GSM (registered trademark) as examples of a wide area communication system (large cell). However, the embodiments are not limited to such examples.

Description will be made under a premise that the narrow area communication system which has narrow service areas, such as LTE, is a wireless communication system cheaper and faster than the wide area communication system which has wide service areas, such as WCDMA. However, the conditions for selecting the wireless communication system are not limited to cheap and high speed.

Further, the wide area communication system and the narrow area communication system only present relative largeness of a service area, for example, relatively wide or narrow (size of a cell radius). Moreover, as having mentioned above, a portable mobile terminal includes various devices which may perform wireless communications, such as not only a smartphone and a mobile phone but also PDA, a game machine, a notebook computer, and a tablet.

Figure 1:
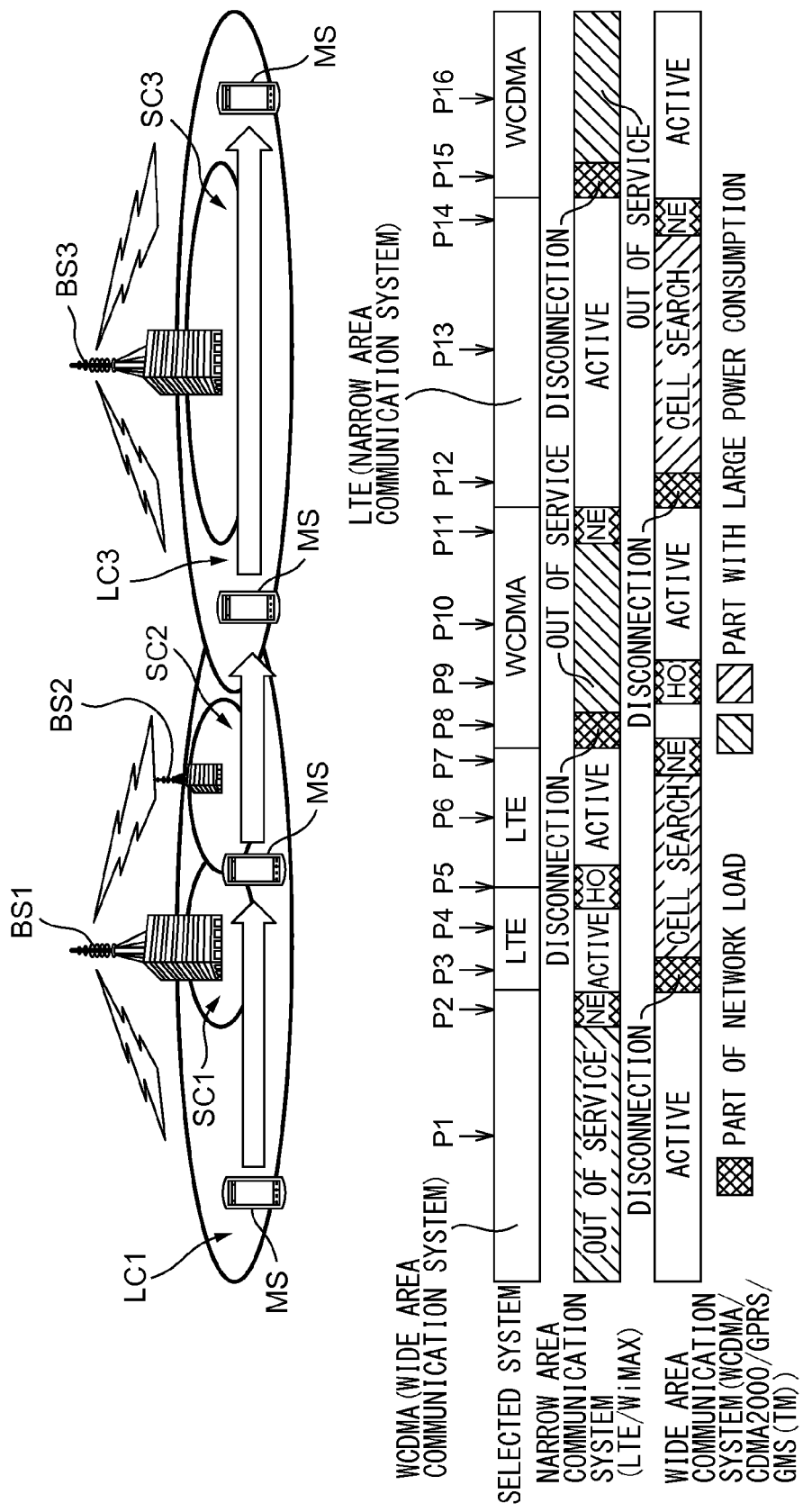
FIG. 1 is a drawing for describing an example of a control method of a wireless communication system when a mobile terminal moves between a plurality of communication systems.

FIG. 1 is a drawing for describing an aspect that the mobile terminal moves between a plurality of communication systems. In FIG. 1, reference marks BS1 and BS3 indicate base stations of a multisystem including both the narrow area communication system and the wide area communication system, and BS2 indicates the base station of only the narrow area communication system, and MS indicates the mobile terminal.

The reference marks LC1 and LC3 indicate cells (large cells) which have wide service areas in base stations BS1 and BS3 according to the wide area communication system. The reference marks SC1 and SC3 indicate cells (small cells) which have narrow (narrower than the large cells LC1 and LC3) service areas in the base stations BS1 and BS3 according to the narrow area communication system. Further, the reference mark SC2 indicates the small cell which has a narrow service area in base station BS2 according to the narrow area communication system.

FIG. 1 is for illustrating a case in which the mobile terminal MS moves toward the right side from the left side of the drawing, i.e. moves toward a position P16 from a position P1. Note that WCDMA in a selected system represents that the wide area communication system (large cell) has been selected, and LTE in the selected system represents that the narrow area communication system (small cell) has been selected.

Therefore, a fact that the selected system is WCDMA means that the wide area communication system, such as CDMA2000, GPRS, and GSM (registered trademark), is selected. Moreover, a fact that the selected system is LTE means that the narrow area communication system, such as WiMAX, is selected.

Specifically, as depicted in FIG. 1, when the mobile terminal MS is located at the position P1, the mobile terminal MS is in a communication area of the large cell LC1 of the base station BS1 according to the wide area communication system (WCDMA), but the mobile terminal MS is not in a communication area of the cell (small cell) of any base station according to the narrow area communication system (LTE).

Therefore, when mobile terminal MS is located at position P1, WCDMA is active and LTE is out of service. Accordingly, the mobile terminal MS at the position P1 communicates by WCDMA of the base station BS1, and WCDMA is set as the selected system.

Next, when the mobile terminal MS has moved to a position P2, the mobile terminal MS is in the communication areas of both the large cell LC1 of the base station BS1 according to WCDMA and the small cell SC1 of the base station BS1 according to LTE. At the time, the mobile terminal MS performs a network entry (NE) of LTE.

When the mobile terminal MS further has moved to a position P3, the mobile terminal MS activates LTE to start the communication with the base station BS1 according to LTE, and performs a disconnection processing (disconnection) on the communication with the base station BS1 according to WCDMA.

Thereby, the communication of the mobile terminal MS switches from the communication with the base station BS1 according to WCDMA to the communication with the base station BS1 according to LTE, while the mobile terminal MS moves from the position P2 to the position P3. In other words, the selected system switches from WCDMA to LTE. When the mobile terminal MS has moved to a position P4, the mobile terminal MS communicates with the base station BS1 according to LTE, and performs a cell search for WCDMA at the time.

When the mobile terminal MS further has come to a position P5, the mobile terminal MS is in the both communication areas of the small cell SC1 of the base station BS1 according to LTE and the small cell SC2 of the base station BS2 according to LTE. The mobile terminal MS performs a handover process (HO: Hand Over) to the small cell SC2 of the base station BS2 according to LTE from the small cell SC1 of the base station BS1 according to LTE.

Note that when the mobile terminal MS has moved to a position P6, the mobile terminal MS communicates with the base station BS2 by LTE, and also continues the cell search for WCDMA at the time.

When the mobile terminal MS has come to a position P7, i.e. when the mobile terminal MS has moved close to a position which departs from the service area of the small cell SC2 of the base station BS2 according to LTE, the mobile terminal MS performs the network entry (NE) to WCDMA.

Further, when the mobile terminal MS has moved to a position P8, the mobile terminal MS activates WCDMA to start the communication with the base station BS1 according to WCDMA, and disconnects the communication of the base station BS2 according to LTE.

Moreover, when the mobile terminal MS has come to a position P9, the mobile terminal MS is in the communication areas of both the large cell LC1 of the base station BS1 according to WCDMA and the large cell LC3 of the base station BS3 according to WCDMA. Then, the mobile terminal MS performs the handover process (HO) to the large cell LC3 of base station BS3 according to WCDMA from the large cell LC1 of the base station BS1 according to WCDMA.

Note that the mobile terminal MS in a position P10 communicates with the base station BS3 according to WCDMA, but the mobile terminal MS is out of service of LTE after disconnecting communication of LTE in the position P8 until reaching the position P10 (until performing the NE process at a position P11).

When the mobile terminal MS has moved to the position P11, the mobile terminal MS is in the communication areas of both the large cell LC3 of the base station BS3 according to WCDMA and the small cell SC3 of the base station BS3 according to LTE, and performs the network entry (NE) to LTE.

Further, when the mobile terminal MS has moved to a position P12, the mobile terminal MS activates LTE to start the communication with the base station BS3 according to LTE, and disconnects the communication with the base station BS3 according to WCDMA.

Note that the processes at the positions P11 and P12 are substantially same as the processes at the positions P2 and P3 mentioned above, respectively. The processes at positions P13 to P15 are substantially same as the processes at the positions P6 to P8 mentioned above respectively, and the process at a position P16 is substantially same as the process at the position P10 mentioned above.

In LTE (the narrow area communication system) and WCDMA (the wide area communication system), the NE (network entry), the disconnection (disconnection processing), and the HO (handover process) apply the load to the network in each of the base stations BS1 to BS3. In addition, the processing for the out of service of LTE and the processing of the cell search for WCDMA consume additional power in the mobile terminal MS.

Figure 2:
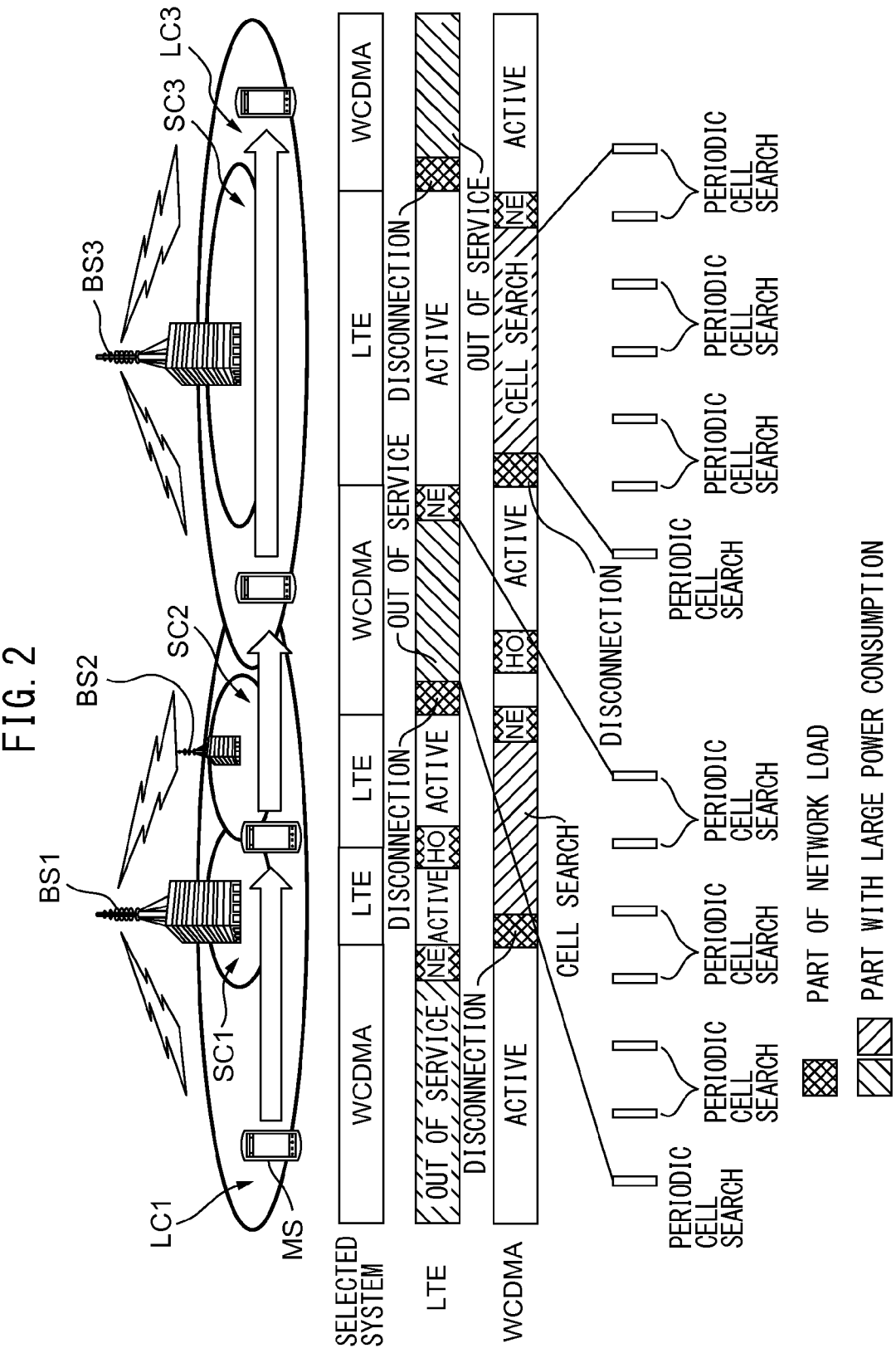
FIG. 2 is a drawing for describing a problem in FIG. 1.

FIG. 2 is a drawing for describing a problem in FIG. 1, and depicts the process for the out of service of LTE mentioned above and the process of the cell search for WCDMA in detail.

As depicted in FIG. 2, during WCDMA is active and thereby the mobile terminal MS communicates according to WCDMA, the mobile terminal MS performs the process for the out of service of LTE. The process for the out of service of LTE causes an increase of power consumption, for example, due to a periodical search of cells according to LTE.

During LTE is active and thereby the mobile terminal MS communicates according to LTE, the mobile terminal MS performs the cell search process for WCDMA. Although the cell search process for WCDMA is performed in the service area of WCDMA, the cell search process causes an increase of power consumption due to a periodical search of cells according to WCDMA, as is the case with the cell search process for LTE performed for the out of service of LTE.

Therefore, the mobile terminal MS, for example, switches to the cheapest and high-speed wireless communication system in the service area where the mobile terminal is located to communicate using the system, but switching the wireless communication system causes an increase of power consumption by a periodic cell search. Such increase of the power consumption will become a large matter as the number of kinds of usable wireless communication systems increases.

Further, when the mobile terminal MS switches the wireless communication systems, connection and disconnection processes of each wireless communication system are performed, but this causes an increase of the network load for such processes, and leads a drop of a connection rate and a throughput capable of being provided to a user.

Figure 3:
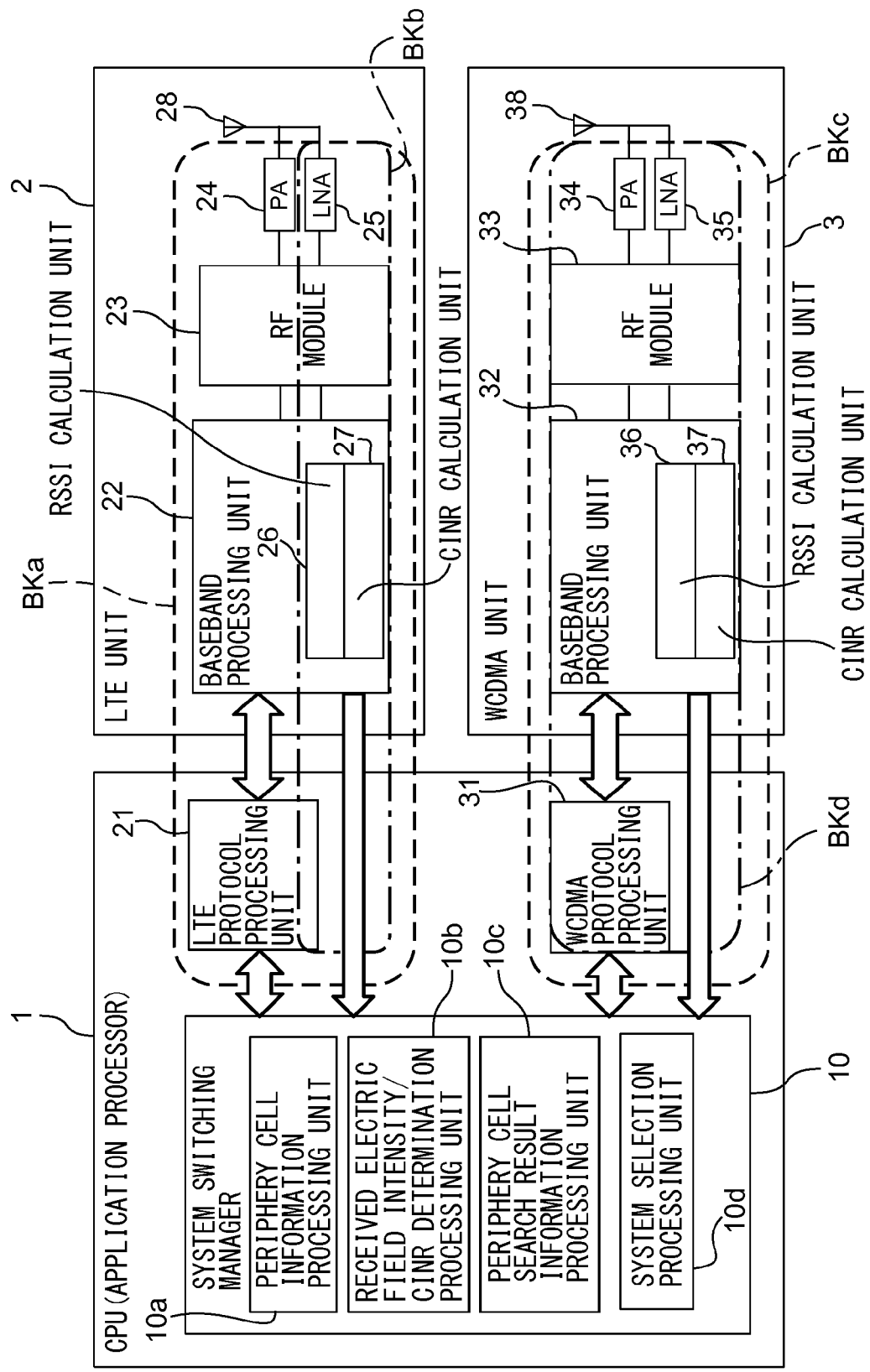
FIG. 3 is a functional block diagram depicting an example of the present embodiment.

Hereinafter, the embodiments of a wireless station, a semiconductor device, a wireless communication system, and a method for controlling the same will be illustrated in detail with reference to accompanying drawings. FIG. 3 is a functional block diagram depicting an example of the present embodiment.

As depicted in FIG. 3, an example of the present embodiment includes a CPU (Central Processing Unit) 1, LTE (Long Term Evolution: narrow area communication system) unit 2, and WCDMA (Wideband Code Division Multiplexing Access: wide area communication system) unit 3.

The CPU (application processor) 1 includes a system switching manager 10 which manages the switching of the wireless communication systems by which the mobile terminal (MS: wireless station) communicates with the base stations (BS: wireless stations). The system switching manager 10 includes a periphery cell information processing unit 10a, a received electric field intensity/CINR determination processing unit 10b, a periphery cell search result information processing unit 10c, and a system selection processing unit 10d.

The periphery cell information processing unit 10a processes the information on periphery cells of the mobile terminal MS. The received electric field intensity/CINR determination processing unit 10b performs a judging process with respect to the received electric field intensity from each base station BS which the mobile terminal MS receives, and the CINR (Carrier to Interference and Noise Ratio).

The periphery cell search result information processing unit 10c processes the information on the search result of the periphery cells, and the system selection processing unit 10d performs a selection process to select the wireless communication system according to the outputs of the periphery cell information processing unit 10a, the received electric field intensity/CINR determination processing unit 10b, and the periphery cell search result information processing unit 10c.

Note that, in the example of FIG. 3, the CPU 1 executes the functions of an LTE protocol processing unit 21 and a WCDMA protocol processing unit 31, but the units may be executed by one or more dedicated processors.

The LTE unit 2 includes an LTE baseband processing unit 22, a radio frequency (RF) module 23, a power amplifier (PA) 24, and a low noise amplifier (LNA) 25. The LTE unit 2 further includes an RSSI (Received Signal Strength Indicator) calculation unit 26 and a CINR calculation unit 27.

Similarly, the WCDMA unit 3 includes a WCDMA baseband processing unit 32, an RF module 33, a PA 34, an LNA 35, an RSSI calculation unit 36, and a CINR calculation unit 37.

The PAs 24 and 34 amplify the radio frequency output of the RF modules 23 and 33, and output the amplified radio frequency to antennas 28 and 38, respectively. Moreover, the LNAs 25 and 35 amplify the radio frequency signals which are input via antennas 28 and 38, and output the amplified radio frequency to the RF modules 23 and 33, respectively.

In FIG. 3, as will be illustrated in detail below, reference marks BKa and BKc indicate blocks for reducing the power consumption at the time of an idle (waiting) processing, and a reference mark BKb indicates a block which operates for the periphery cell search at the time of the idle processing. In addition, a reference mark BKd indicates a block which operates for performing the location update at the time of the idle processing.

Figure 4:
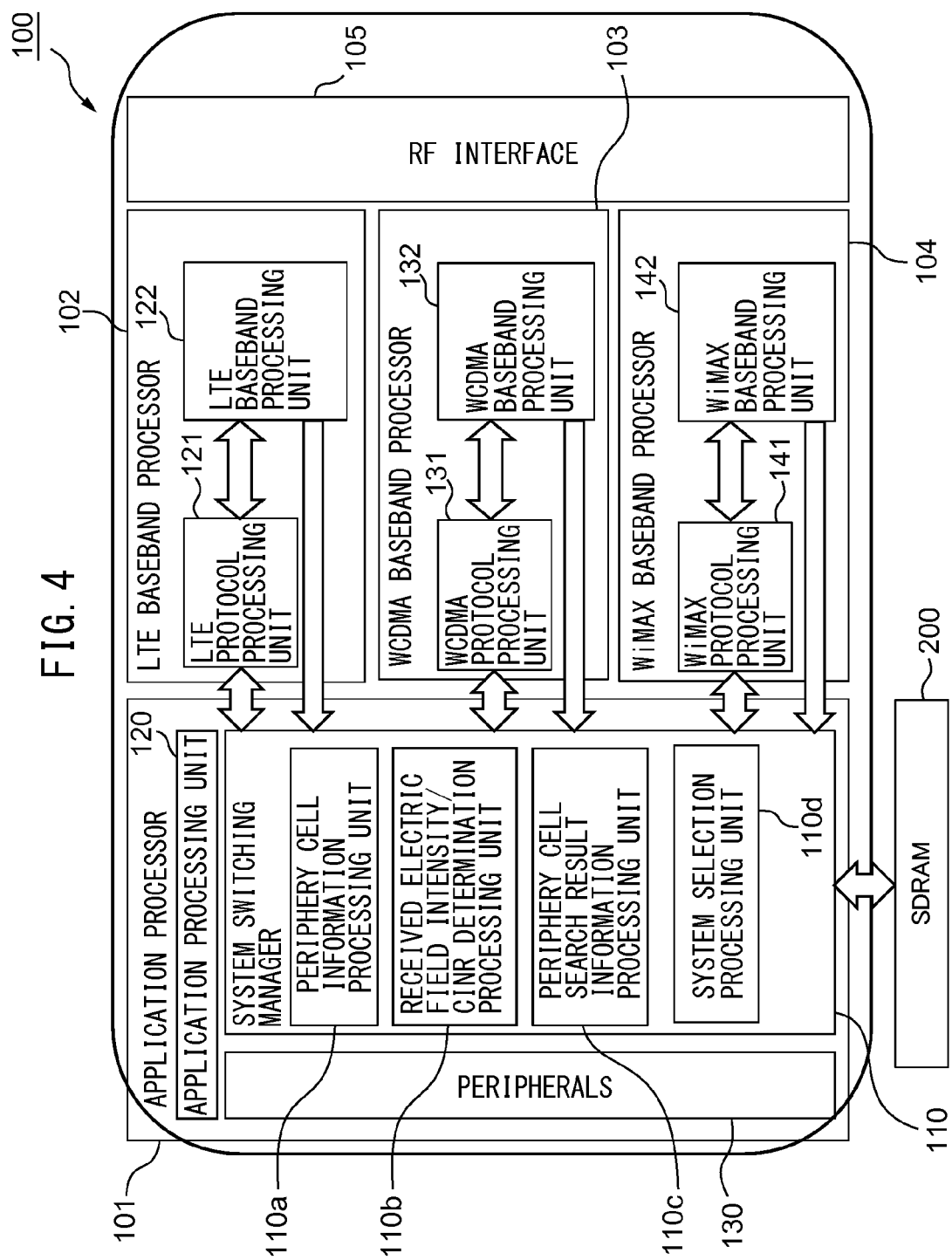
FIG. 4 is a block diagram depicting an example of a semiconductor device according to the present embodiment.

FIG. 4 is a block diagram depicting an example of the semiconductor device according to the present embodiment. As depicted in FIG. 4, an example of the semiconductor device according to the present embodiment includes an application processor 101, an LTE baseband processor 102, a WCDMA baseband processor 103, a WiMAX baseband processor 104, and an RF interface 105.

The application processor 101, respective baseband processors 102, 103 and 104, and the RF interface 105 may be formed by one semiconductor device (SoC: System-on-a-Chip) 100, for example. Note that the configuration depicted in FIG. 4 is a mere example and the components may be formed by a plurality of semiconductor chips, instead of forming by the one SoC 100.

The application processor 101 includes a system switching manager 110, an application processing unit 120, and peripherals 130, which are illustrated with reference to FIG. 3. The system switching manager 110 includes a periphery cell information processing unit 110a, a received electric field intensity/CINR determination processing unit 110b, a periphery cell search result information processing unit 110c, and a system selection processing unit 110d.

The LTE baseband processor 102 includes an LTE protocol processing unit 121 and an LTE baseband processing unit 122, and the WCDMA baseband processor 103 includes a WCDMA protocol processing unit 131 and a WCDMA baseband processing unit 132. The WiMAX baseband processor 104 includes a WiMAX protocol processing unit 141 and a WiMAX baseband processing unit 142.

In other words, in the example of FIG. 4, each of the protocol processing units 121, 131 and 141 and each of the baseband processing units 122, 132 and 142 are provided in dedicated baseband processors 102, 103 and 104.

Figure 5:
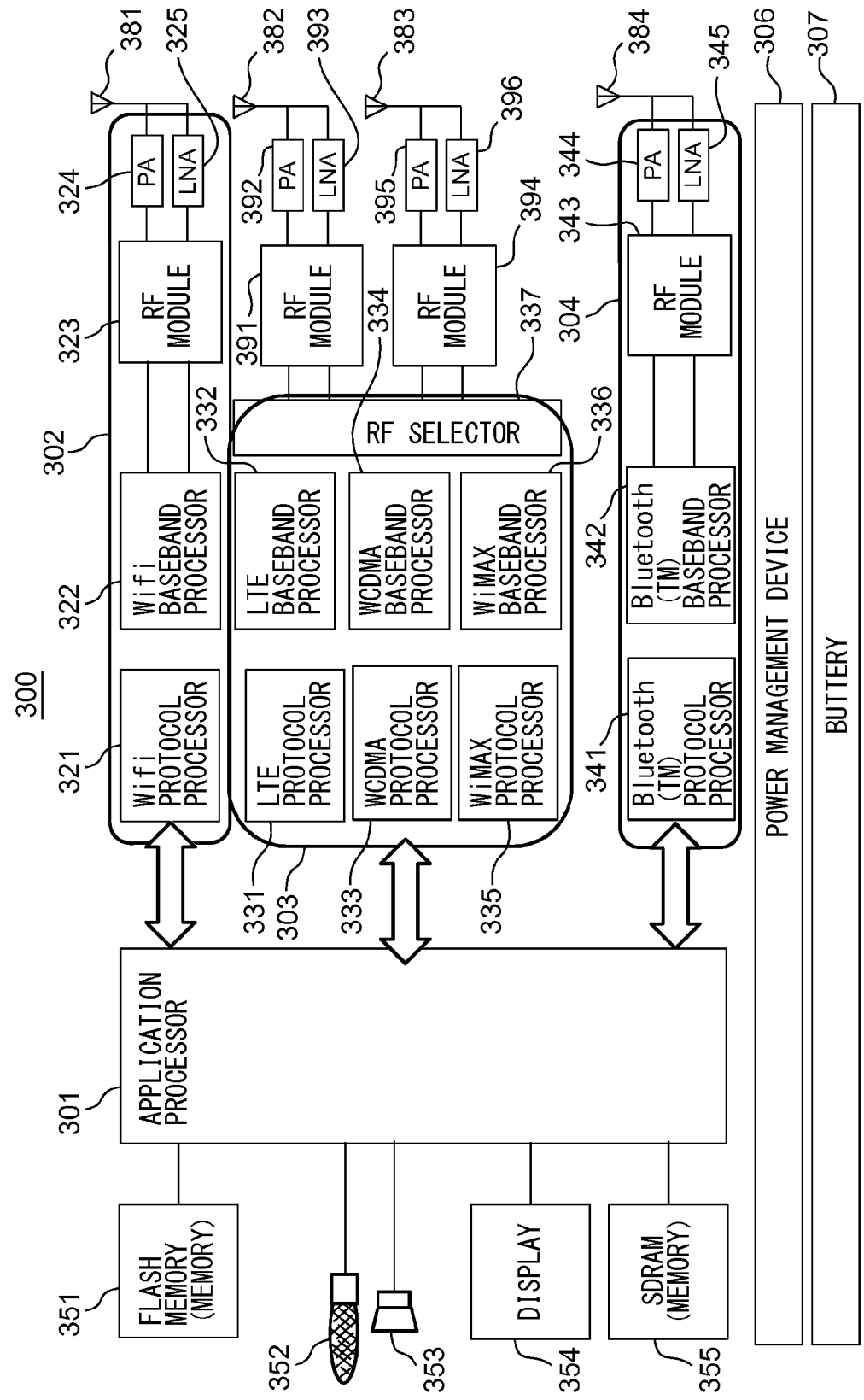
FIG. 5 is a block diagram depicting an example of a wireless station according to the present embodiment.

FIG. 5 is a block diagram depicting an example of the wireless station (mobile terminal MS) 300 according to the present embodiment. As depicted in FIG. 5, the mobile terminal 300 includes an application processor 301, a first wireless communication unit 302, a second wireless communication unit 303, a third wireless communication unit 304, a flash memory 351, a microphone 352, a loudspeaker 353, and a display 354.

The mobile terminal 300 further includes an SDRAM (memory) 355, a power management device 306, a battery 307, RF modules 391 and 394, PAs 392 and 395, LNAs 393 and 396, and antennas 381 to 384.

The first wireless communication unit 302 is, for example, for communicating with an access point according to WiFi (Wireless Fidelity), and includes a WiFi protocol processor 321, a WiFi baseband processor 322, and an RF module 323. The first wireless communication unit 302 further includes a PA 324 and an LNA 325.

In other words, the first wireless communication unit 302 corresponds to one-chip IC (Integrated Circuit) in which components other than the antenna 381 are provided, in order to perform the WiFi communication with the access point.

The second wireless communication unit 303 is for switching to any of LTE, WCDMA, and WiMAX to communicate with the base station (BS), and includes an LTE protocol processor 331, an LTE baseband processor 332, and an RF selector 337.

The second wireless communication unit 303 further includes a WCDMA protocol processor 333, a WCDMA baseband processor 334, a WiMAX protocol processor 335, and a WiMAX baseband processor 336.

Either one of the wireless communication systems of LTE, WCDMA, and WiMAX is selected by the RF selector 337 to output signals to either the RF module 391 or 394. The frequency bands used by the RF modules 391 and 394 are different from each other, for example.

The RF module 391 is connected to the antenna 382 through the PA 392 and the LNA 393, and the RF module 394 is connected to the antenna 383 through the PA 395 and the LNA 396.

The third wireless communication unit 304 is, for example, for performing near field communication according to Bluetooth (registered trademark), and includes a Bluetooth (registered trademark) protocol processor 341 and a Bluetooth (registered trademark) baseband processor 342. The third wireless communication unit 304 further includes an RF module 343, a PA 344, and an LNA 345.

In other words, the third wireless communication unit 304 corresponds to one-chip IC in which components other than the antenna 384 are provided, in order to perform Bluetooth (registered trademark) communication.

Note that the mobile terminal 300 depicted in FIG. 5 is compatible with each of the wireless communication systems of WiFi, LTE, WCDMA, WiMAX, and Bluetooth (registered trademark), but the mobile terminal according to the present embodiment is not limited to such wireless communication systems and may be compatible with other various wireless communication systems.

Figure 6:
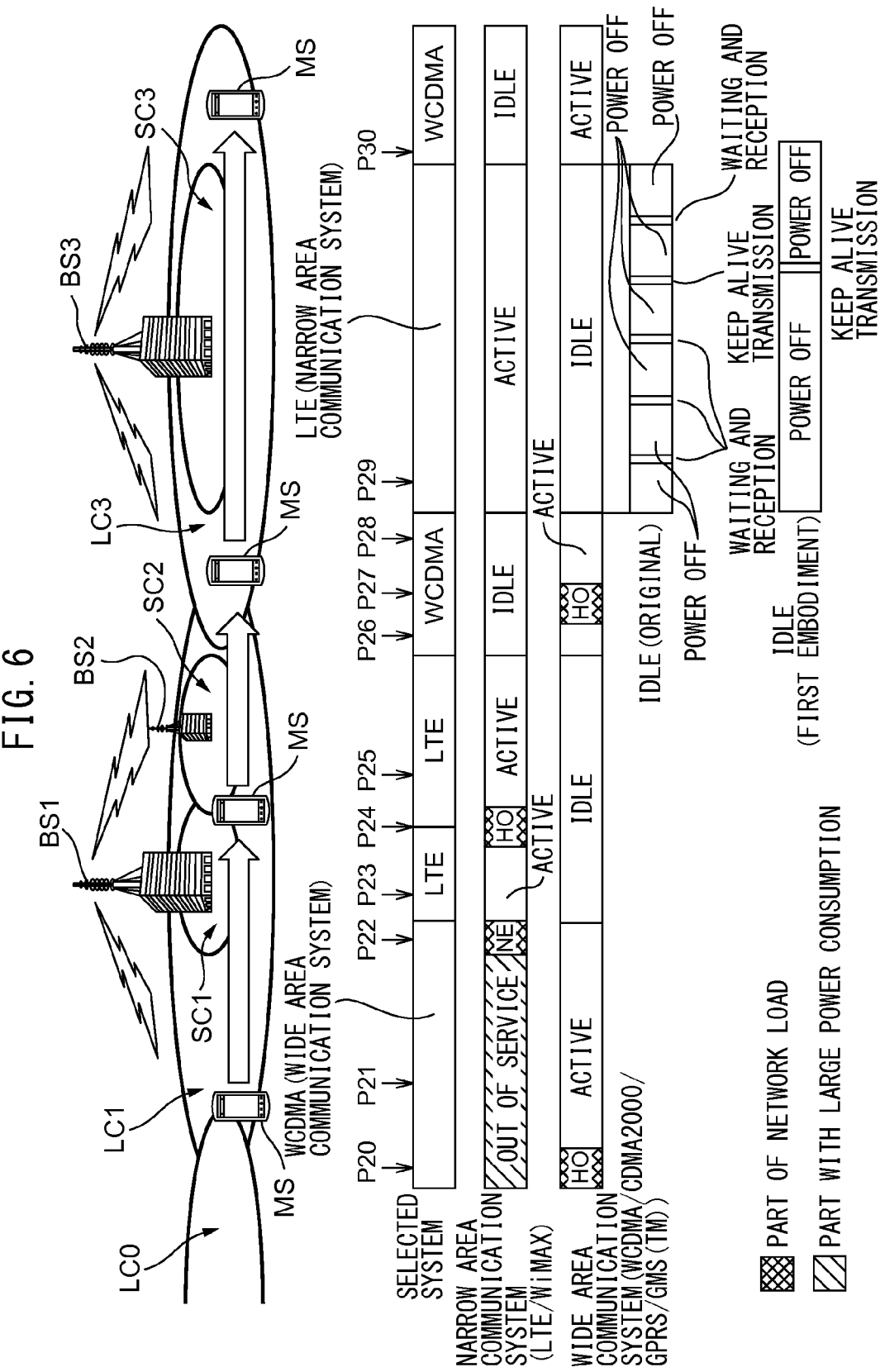
FIG. 6 is a drawing for describing a first embodiment of the control method of the wireless communication system.

FIG. 6 is a drawing for describing a first example of the control method of the wireless communication system. In FIG. 6, reference marks BS1 and BS3 indicate the base stations (BS) with a multisystem including both the wide area communication system (a first wireless communication system) and the narrow area communication system (a second wireless communication system). A reference mark BS2 indicates the base station only with the narrow area communication system, and a reference mark MS indicates the mobile terminal.

Reference marks LC1 and LC3 indicate the cells (large cells: first cells) which include wide service areas of the base stations BS1 and BS3 according to the wide area communication system. Reference marks SC1 and SC3 indicate the cells (small cells: second cells) which include narrow service areas (narrower than the service area of the large cells LC1 and LC3) of the base stations BS1 and BS3 according to the narrow area communication system.

Further, a reference mark SC2 indicates the small cell which includes the narrow service area of the base station BS2 according to the narrow area communication system, and LC0 indicates the large cell which includes the wide service area of the base station not depicted according to the wide area communication system.

As with FIG. 1 mentioned above, FIG. 6 is for illustrating a case in which the mobile terminal (wireless station) MS moves to right side from the left side in the drawing, i.e. moves toward a position P30 from a position P20. Note that WCDMA in a selected system represents that the wide area communication system (large cell) has been selected, and LTE in the selected system represents that the narrow area communication system (small cell) has been selected.

Therefore, a fact that the selected system is WCDMA means that the wide area communication systems, such as CDMA2000 and GPRS, are selected, and a fact that the selected system is LTE means that the narrow area communication systems, such as WiMAX, are selected.

As mentioned above, the data communication (communication) of a mobile terminal (MS) is performed while switching usable wireless communication systems in a service area in which the mobile terminal MS is located, for example. In other words, at the service area in which the mobile terminal MS is located, communication is made by switching to a cheapest and high-speed wireless communication system, for example.

Description will be made under a premise that the narrow area communication system which has narrow service areas, such as LTE, is a wireless communication system cheaper and faster than the wide area communication system which has wide service areas, such as WCDMA. However, conditions for selecting the wireless communication system are not limited to cheap and high speed. Moreover, the wide area communication system and the narrow area communication system only present relative largeness of a service area (cell), for example, relatively wide or narrow.

Specifically, as depicted in FIG. 6, when the mobile terminal MS is located at a position P20, the mobile terminal MS is in the communication areas of both large cell LC0 of the base station not depicted according to the wide area communication system (WCDMA), and large cell LC1 of the base station BS1 according to the wide area communication system (WCDMA). Therefore, the mobile terminal MS performs the handover process (HO) to the large cell LC1 from the large cell LC0.

Next, when the mobile terminal MS has moved to a position P21, the mobile terminal MS communicates with the base station BS1 according to WCDMA, and the selected system is set as WCDMA. At the time, since LTE is out of service, the periodic cell search is performed as is the cases illustrated with reference to FIG. 1 and FIG. 2.

Further, when the mobile terminal MS has moved to a position P22, the mobile terminal MS is in the communication areas of both large cell LC1 of the base station BS1 according to WCDMA, and small cell SC1 of the base station BS1 according to LTE, and performs the network entry (NE) of LTE.

After completing the NE process, LTE becomes active (for example, at a position P23), and the communication with the base station BS1 according to LTE becomes possible.

In the first embodiment (also in other embodiments), WCDMA is set as waiting (idle) instead of performing the disconnection processing on the communication with the base station BS1 according to WCDMA and performing the cell search for WCDMA, which is illustrated with reference to FIG. 1 and FIG. 2.

Further, when the mobile terminal MS has come to a position P24, the mobile terminal MS is in the communication areas of both the small cell SC1 of the base station BS1 according to LTE, and the small cell SC2 of the base station BS2 according to LTE. Therefore, the mobile terminal MS performs the handover process (HO) to the small cell SC2 of the base station BS2 according to LTE from the small cell SC1 of the base station BS1 according to LTE.

When the mobile terminal MS has moved to a position P25, the mobile terminal MS communicates with the base station BS2 according to LTE, but the idle (idle processing) of WCDMA is maintained at the time.

When the mobile terminal MS has come to a position P26, i.e. the mobile terminal MS departs from the service area of the small cell SC2 of the base station BS2 according to LTE, the mobile terminal MS activates WCDMA to start the communication with the base station BS1 according to WCDMA.

At the time, when the mobile terminal MS starts the communication with the base station BS1 according to WCDMA at the position P26, LTE is set as idle instead of performing the disconnection processing on the communication with the base station BS2 according to LTE and performing the cell search for LTE.

When the mobile terminal MS has come to a position P27, the mobile terminal MS is in the communication areas of both large cell LC1 of the base station BS1 according to WCDMA and large cell LC3 of the base station BS3 according to WCDMA. Then, the mobile terminal MS performs the handover (HO) process to the large cell LC3 of the base station BS3 according to WCDMA from the large cell LC1 of the base station BS1 according to WCDMA.

Note that the mobile terminal MS in a position P28 communicates with the base station BS3 according to WCDMA, but LTE is still in idle during the selected system is WCDMA, i.e. until LTE next becomes active.

When the mobile terminal MS has moved to a position P29, the mobile terminal MS is in the communication areas of both large cell LC3 of the base station BS3 according to WCDMA and small cell SC3 of the base station BS3 according to LTE, and communication is made by switching from WCDMA to LTE.

Although the mobile terminal MS communicates with the base station BS3 according to LTE, WCDMA is still in idle during the selected system is LTE, i.e. until WCDMA next becomes active.

When the mobile terminal MS has moved to a position P30, the mobile terminal MS activates WCDMA to start the communication with the base station BS3 according to WCDMA, and LTE is set as idle.

In this way, according to the first embodiment, for example, after switching from WCDMA to LTE, WCDMA which is used before switching is set as idle, thereby allowing a reduction of the disconnection processing and the connection (reconnection) process, and a reduction of a wireless resource.

When switching from WCDMA of the large cell LC1 to LTE of the small cell SC1, for example, waiting and reception (paging) is dispensable since WCDMA which becomes in idle after switching to LTE may transmit and receive data by active LTE.

Further, since a position where LTE of small cell SC1 is connected is also in the communication area of WCDMA of the large cell LC1, for example, it is possible to reduce the periphery cell search. In order to maintain an idle state, such a keep alive transmission is performed.

According to the first embodiment, for example, in an idle state of WCDMA at a position P29, the waiting and reception are canceled and only keep alive transmission is performed, thereby, it may be possible to further reduce the power consumption.

In other words, although a normal idle processing (original) performs, for example, a plurality of waiting and receptions and keep alive transmissions, the idle processing of WCDMA according to the first embodiment cancels the waiting and reception, and only performs the keep alive transmission, for example. In other words, in an idle processing of WCDMA, for example, the location update (location registration update) is only performed as the keep alive transmission to maintain an idle state.

In this way, the idle processing of WCDMA may be carried out to perform the keep alive transmission (location update) without performing the waiting and reception, for example, and therefore it may be possible to provide a significant reduction of the power consumption.

Figure 7:
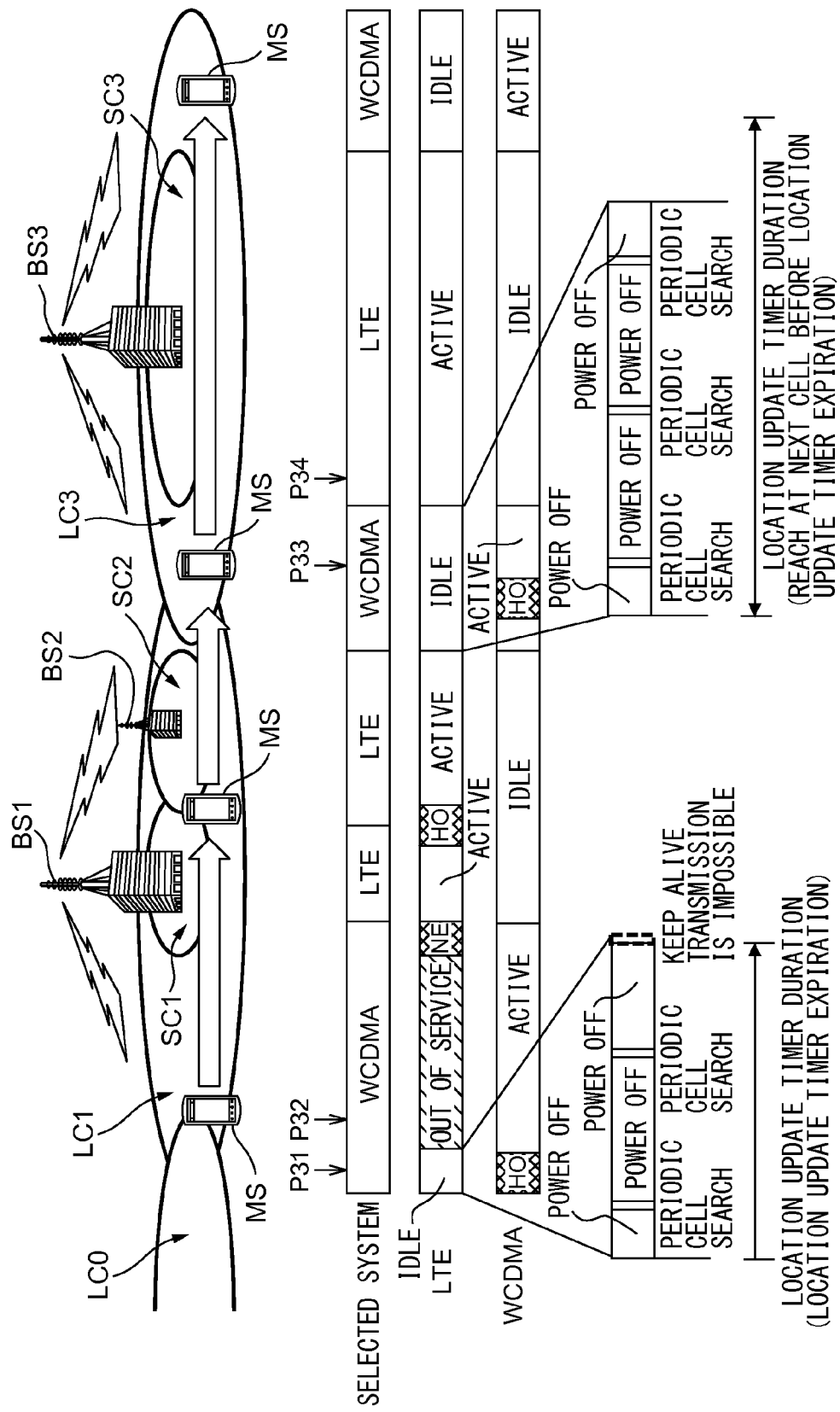
FIG. 7 is a drawing for describing a second embodiment of the control method of the wireless communication system.

FIG. 7 is a drawing for describing a second embodiment of the control method of the wireless communication system. Although, the first embodiment depicted in FIG. 6 has illustrated the processes performed when the mobile terminal MS moves between the different communication systems (LTE, WCDMA) paying attention to the idle processing of WCDMA, the second embodiment depicted in FIG. 7 mainly illustrates processing of the idle of LTE. It is assumed that, in FIG. 7, the mobile terminal MS performs the idle processing of LTE at a position P31.

In other words, as depicted in FIG. 7, when the mobile terminal MS is located at the position P31, the mobile terminal MS is in the communication areas of both large cells LC0 and LC1 according to WCDMA, and therefore the mobile terminal MS performs the handover process (HO) to the large cell LC1 from the large cell LC0.

When the mobile terminal MS is located at a position P31, the mobile terminal MS performs the idle processing of LTE. As depicted in FIG. 7, the idle processing of LTE repeats the periodic cell search, and when the location update timer expires, the mobile terminal is out of service at a position P32.

The fact that the location update timer expires corresponds to, for example, the fact that it is not possible to synchronize with the base station of LTE and to perform the keep alive transmission within the predetermined location update timer duration. Note that the processes for the out of service of LTE causes an increase of the power consumption because of periodically performing the cell search according to LTE, as illustrated with reference to FIG. 2, for example.

On the other hand, when the mobile terminal MS is located at a position P33, the mobile terminal MS not only communicates by WCDMA but also performs the idle processing of LTE. Although the idle processing of LTE by the mobile terminal MS at the position P33 repeats the periodic cell search as with the case at the position P31, the processing is for a case of reaching the subsequent small cell (small cell SC3 according to LTE) within the predetermined location update timer duration.

In other words, when the mobile terminal MS moves to a position P34 from the position P33, the mobile terminal MS activates LTE without performing the network entry (NE) of LTE, when new LTE (small cell SC3 of the base station BS3 according to LTE) is detected, by the idle processing of LTE.

Thereby, when the mobile terminal MS has moved to the position P34, LTE is in active and the communication is performed by LTE of the base station BS3 with the small cell SC3. Although the mobile terminal MS performs the idle processing of WCDMA when the mobile terminal MS is located at the position P34, the idle processing of the WCDMA may be carried out to perform the keep alive transmission, as is the case with the process illustrated with reference to FIG. 6, for example.

By the way, when switching from LTE of small cell SC1 to WCDMA of large cell LC1 for example, LTE which becomes in an idle state after switching to WCDMA may be out of service in many cases.

Therefore, the periphery cell search is performed in the state of the out of service only during the predetermined period (location update timer duration), and the idle state is maintained when a new system (LTE) with small cell is found before performing the keep alive transmission (before the location update timer duration expires) (position P33). Note that, when it is not possible to perform the keep alive transmission (when the location update timer duration expires), a process for out of service is performed as-is, for example as the processes at the positions P31 and P32 in FIG. 7.

Figure 8:
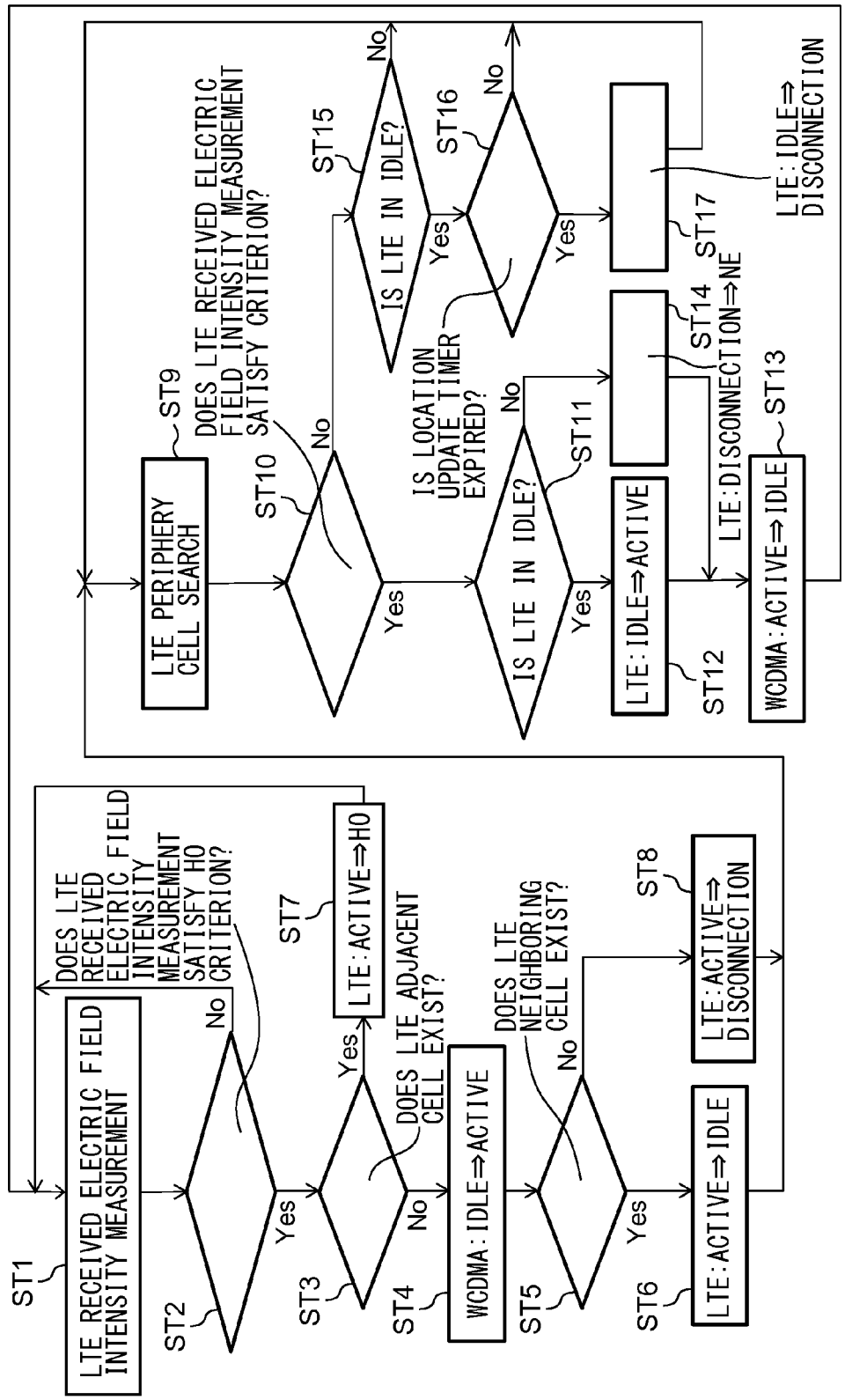
FIG. 8 is a flowchart for describing an example of processes of the control method of the wireless communication system in the first and second embodiments depicted in FIG. 6 and FIG. 7.

FIG. 8 is a flowchart for describing an example of processes of the control method of the wireless communication system in the first and second embodiments depicted in FIG. 6 and FIG. 7. First, when the control processing of the wireless communication system starts, LTE received electric field intensity is measured at step ST1 and it proceeds to step ST2.

At step ST2, it is judged whether or not the measured LTE received electric field intensity satisfies HO criterion (criterion of the handover process). The fact that LTE received electric field intensity satisfies the HO criterion corresponds to, for example, a case that the LTE received electric field intensity is lower than a predetermined level.

When it is judged that the LTE received electric field intensity satisfies the HO criterion at step ST2, it proceeds to step ST3 and it is judged whether or not a LTE adjacent cell exists. The LTE adjacent cell to be judged at the step ST3 means a cell which directly adjacent to the cell which is communicating actually, and is possible to perform the handover process.

When it is judged that the LTE adjacent cell exists at the step ST3, it proceeds to step ST7, and activate LTE, i.e. performs the handover process (HO) to communicate with the adjacent cell according to LTE, and it returns to step ST1. The processing at step ST7 corresponds to the processing of LTE at the position P24 in FIG. 6, for example.

On the other hand, when it is judged that the LTE adjacent cell does not exist at the step ST3, it proceeds to step ST4 and switches WCDMA from idle to active to communicate according to WCDMA, and it proceeds to step ST5.

The processing at step ST4 corresponds to the processing of WCDMA at the position P26 in FIG. 6, for example. Note that when it is judged that the LTE received electric field intensity does not satisfy the HO criterion at the step ST2, it returns to the step ST1 as-is.

At step ST5, it is judged whether or not an LTE neighboring cell exists. The LTE neighboring cell to be judged at the step ST5 does not directly adjacent to the cell which is communicating actually and means a cell which exists near the cell which is communicating actually when such cell exists in the near distance.

When it is judged that the LTE neighboring cell exists at step ST5, it proceeds to step ST6 and switches LTE from active to idle, and proceeds to step ST9. In other words, it switches to an idle without performing the disconnection processing of LTE.

On the other hand, when it is judged that the LTE neighboring cell does not exist at the step ST5, it proceeds to step ST8, and the disconnection processing (disconnection) is performed on the active LTE, and it proceeds to step ST9. At step ST9, an LTE periphery cell search is performed, and it proceeds to step ST10 to judge whether or not the LTE received electric field intensity satisfies the criterion.

A fact that the LTE received electric field intensity satisfies the criterion corresponds to a case that the LTE received electric field intensity is greater than a predetermined level, for example. The processing at step ST10 corresponds to the processing of LTE at the position P29 in FIG. 6, for example.

At the step ST10, when it is judged that the LTE received electric field intensity satisfies the criterion, it proceeds to step ST11 to judge LTE is in an idle. When it is judged that the LTE is in an idle at the step ST11, it proceeds to step ST12, and LTE is switched from idle to active and it proceeds to step ST13. Thereby, it is possible to switch to active without performing the network entry to LTE.

On the other hand, when it is judged that LTE is not in idle at the step ST11, it proceeds to step ST14, and performs a network entry (NE) of LTE from a disconnection state, and proceeds to step ST13. The network entry of LTE in the step ST14 also includes an active processing of LTE.

On the other hand, when it is judged that the LTE received electric field intensity does not satisfy the criterion at the step ST10, it proceeds to step ST15 to judge whether or not LTE is in an idle. When it is judged that LTE is in an idle at the step ST15, it proceeds to step ST16 to judge whether or not the location update timer has expired.

When it is judged that, at the step ST16, the location update timer has expired, i.e. the predetermined location update timer duration has elapsed, for example, it proceeds to step ST17, the disconnection processing is performed on the active LTE, and it returns to the step ST9.

Therefore, when a new LTE is not found within the location update timer duration, the disconnection processing similar to the processing which is illustrated with reference to FIG. 1 and FIG. 2 is performed. The processing of the step ST16 corresponds to a processing of LTE at the position P31 in FIG. 7, for example, and it is judged as out of service in FIG. 7.

Note that when it is judged that the location update timer duration has not elapsed at the step ST16, it returns to the step ST9 as-is. When it is judged that LTE is not in an idle at step ST15, it returns to the step ST9 as-is.

Figure 9:
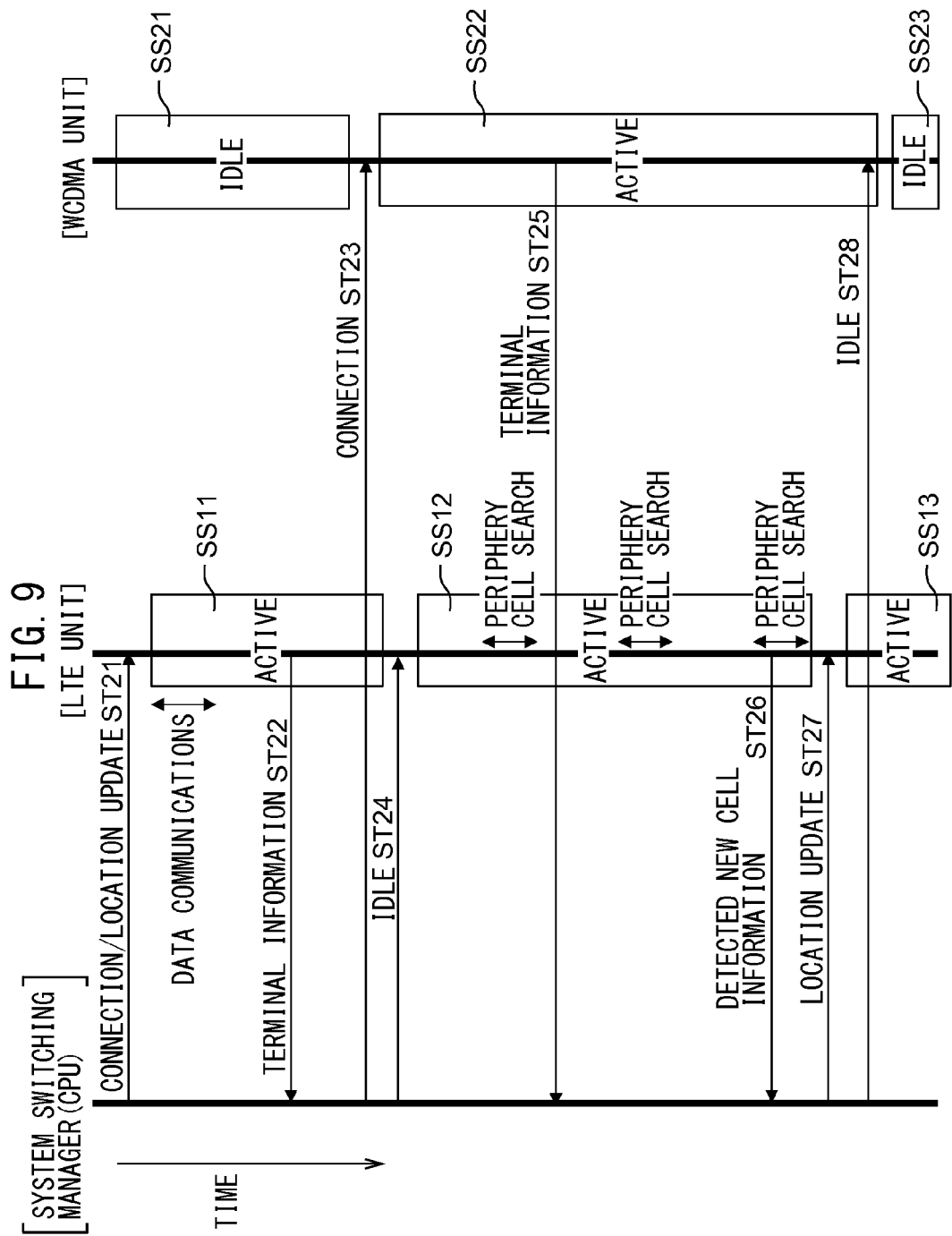
FIG. 9 is a drawing for describing a flow of a protocol of the control method of the wireless communication system depicted in FIG. 7.

FIG. 9 is a drawing for describing a flow of a protocol of the control method of the wireless communication system depicted in FIG. 7, and depicts, for example, the flow of the protocol between the system switching manager 10 in FIG. 3 mentioned above and the LTE unit 2, and between the system switching manager 10 and the WCDMA unit 3, in time series.

As depicted in FIG. 9, for example, when the system switching manager 10 instructs the LTE unit 2 to establish a connection/to perform the location update (ST21), LTE becomes active (SS11) and communicates (performs data communication) with the base stations of LTE.

At the time, WCDMA is in an idle (SS21). Note that the idle processing of WCDMA may be carried out to perform the keep alive transmission (location update) without performing the waiting and reception, for example.

Then, terminal information is provided to the system switching manager 10 by the communication of LTE (ST22). In accordance with the terminal information, the system switching manager 10 switches to the connection according to WCDMA (ST23), and sets LTE into an idle state (ST24).

Thereby, WCDMA becomes active (SS22), and communication is performed according to WCDMA, and LTE becomes in an idle (SS12). The terminal information is provided to the system switching manager 10 by communication of WCDMA (ST25). Note that LTE in idle performs the waiting and reception, for example until the location update timer expires.

When the LTE unit 2 outputs new cell information to the system switching manager 10 (ST26), the system switching manager 10 performs the location update to the LTE unit 2 (ST27), and activates LTE again (SS13).

Further, the system switching manager 10 sets WCDMA into an idle (ST28). Thereby, WCDMA becomes an idle again (SS23).

Figure 10:
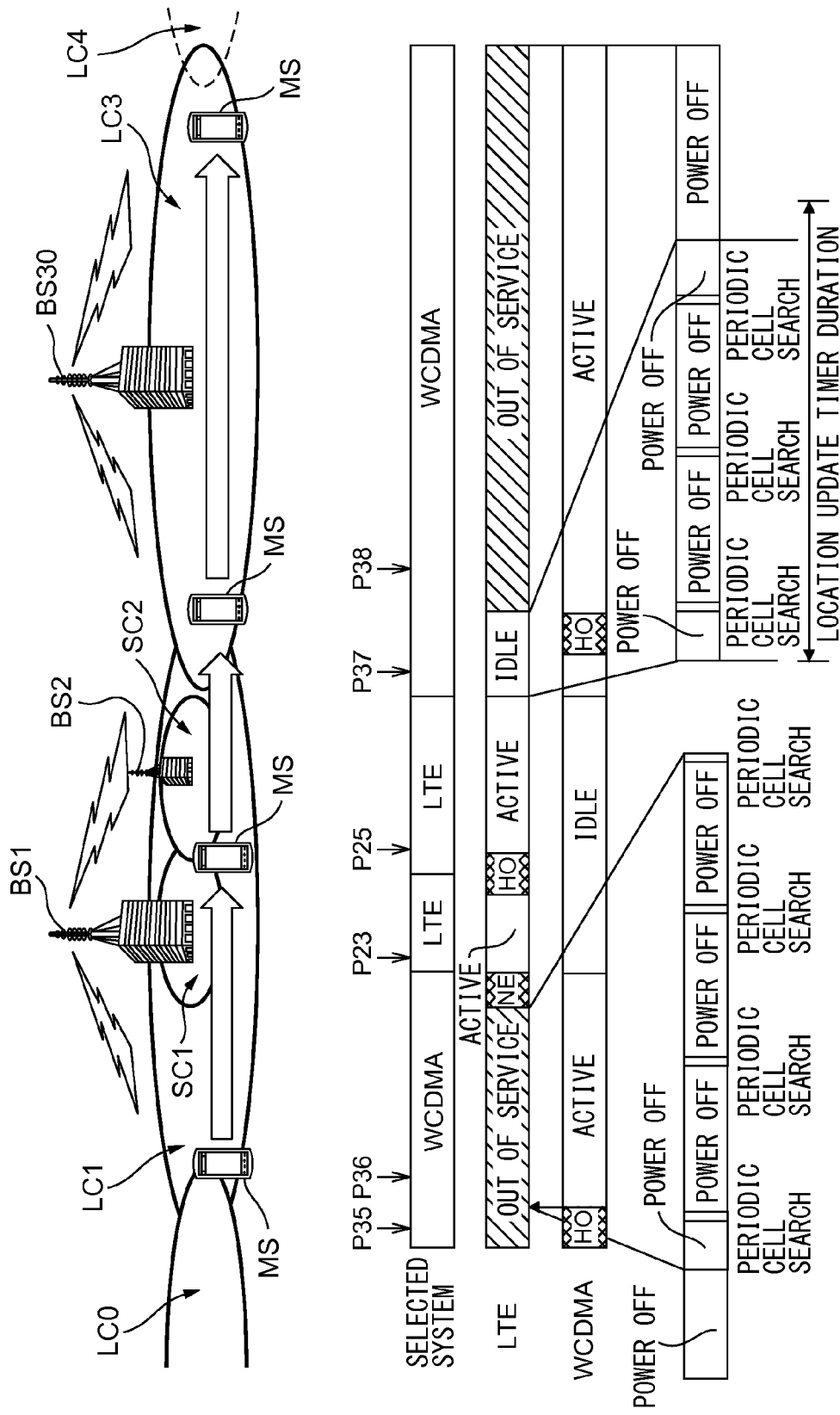
FIG. 10 is a drawing (first) for describing a third embodiment of the control method of the wireless communication system.
Figure 11:
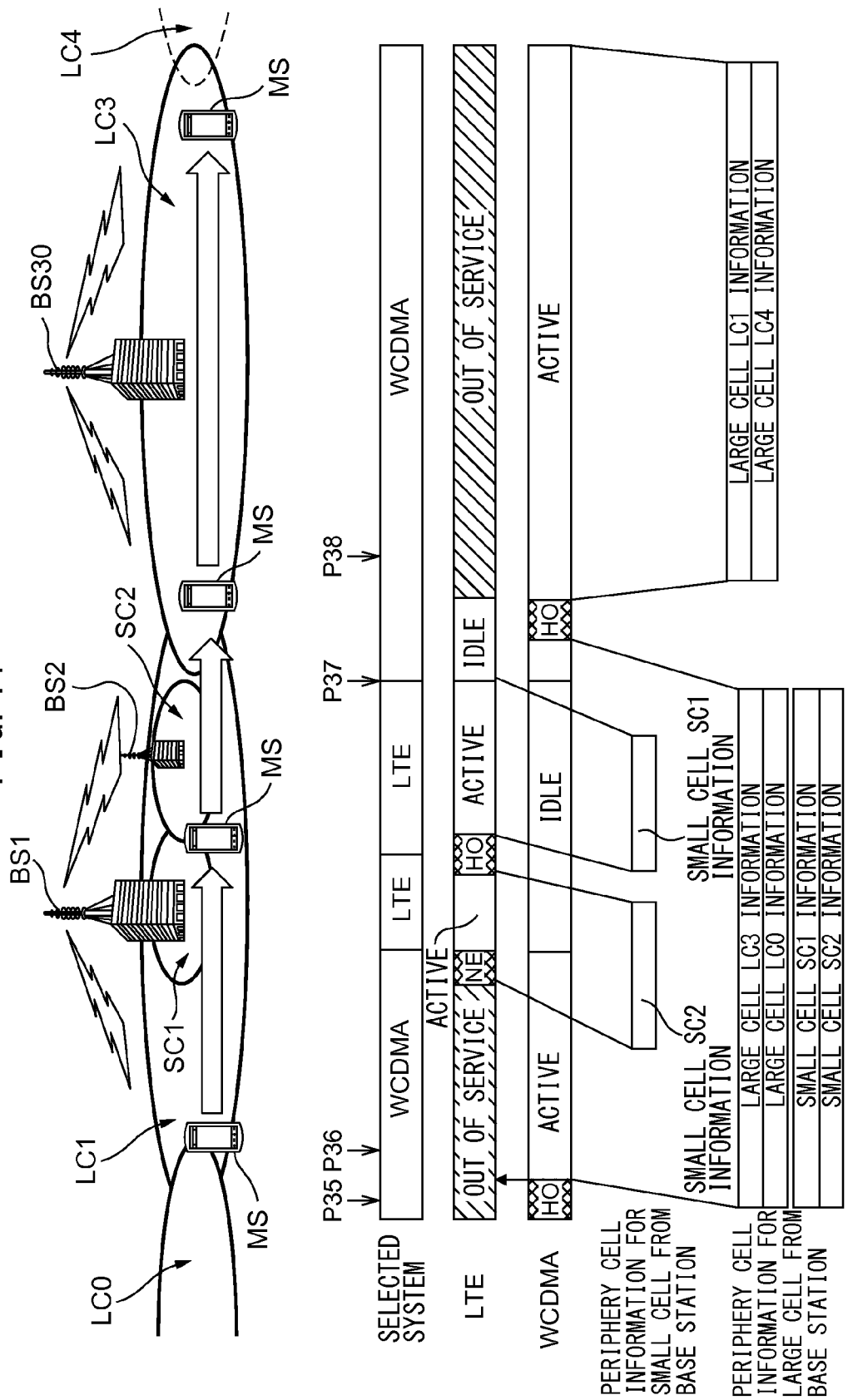
FIG. 11 is a drawing (second) for describing the third embodiment of the control method of the wireless communication system.

FIG. 10 and FIG. 11 are drawings for describing the third embodiment of the control method of the wireless communication system. The base stations 30 in FIG. 10 and FIG. 11 are, for example, the base stations of only the wide area communication system, and are different from the base station 3 which includes both the narrow area communication system and the wide area communication system in FIG. 6 and FIG. 7 which is mentioned above. Therefore, FIG. 10 and FIG. 11 do not include the small cell SC3 according to LTE depicted in FIG. 6 and FIG. 7.

The present third embodiment receives the periphery cell information provided by a broadcast transmission according to WCDMA by performing the periodic cell search during the waiting and reception of LTE (idle), or outside the service area, for example, and optimizes the operation frequency of the periodic cell search utilizing the periphery cell information.

In other words, as depicted FIG. 10 and FIG. 11, when the mobile terminal MS is located at a position P35, the mobile terminal MS receives the periphery cell information by the broadcast transmission of WCDMA. Specifically, for example, when it is found that the small cells SC1 and SC2 according to LTE exist in the large cell LC1 according to WCDMA based on the periphery cell information received at the position P35, the periodic cell search is started in the process for the out of service of LTE at the position P36.

When the mobile terminal MS is located at a position P37, the mobile terminal MS receives the periphery cell information by a broadcast transmission of WCDMA. Specifically, for example, when it is found that the small cell according to LTE does not exist in the large cell LC3 before expiration of the location update timer based on the periphery cell information received at the position P37, the periodic cell search is stopped in the process for the out of service of LTE at the position P38.

In this way, according to the present third embodiment, for example, the operation frequency of the periodic cell search is optimized during the idle of LTE or outside the service area utilizing the periphery cell information provided by the broadcast transmission by WCDMA, and thereby it is possible to suppress an increase of wasteful power consumption.

As depicted in FIG. 11, the periphery cell information from the base station BS1 for the large cell LC1 includes, for example, the information of the large cell LC3, the information of the large cell LC0, the information of the small cell SC1, and the information of the small cell SC2. The periphery cell information from the base station BS30 for the large cell LC3 includes, for example, the information of the large cell LC1 and the information of the large cell LC4.

In other words, for example, when the mobile terminal MS is located at the position P36, the mobile terminal MS receives the information of the large cell LC3 of the base station BS3 according to WCDMA, and the information of the large cell LC0 of a not-depicted base station according to WCDMA from the base station BS1 with the large cell LC1 according to WCDMA.

In addition, for example, when the mobile terminal MS is located at the position P36, the mobile terminal MS receives the information of the small cell SC1 of base station BS1 according to LTE and the information of the small cell SC2 of the base station BS2 according to LTE as the periphery cell information from the base station BS1 with the large cell LC1 according to WCDMA.

Further, for example, when the mobile terminal MS is located at the position P38, the mobile terminal MS receives the information of the large cell LC1 of the base station BS1 according to WCDMA, and the information of the large cell LC0 according to WCDMA from the base station BS30 with the large cell LC3 according to WCDMA.

As depicted in FIG. 11, the periphery cell information from base station BS1 for the small cell SC1 includes the information of the small cell SC2 for example, and the periphery cell information from base station BS2 for the small cell SC2 includes the information of the small cell SC1 for example.

In other words, for example, when the mobile terminal MS is located at the position P23, the mobile terminal MS receives the information of the small cell SC2 of the base station BS2 according to LTE from the base station BS1 with the small cell SC1 according to LTE as the periphery cell information.

Further, for example, when the mobile terminal MS is located at the position P25, the mobile terminal MS receives the information of the small cell SC1 of the base station BS1 according to LTE from the base station BS2 with the small cell SC2 according to LTE as the periphery cell information.

Figure 12:
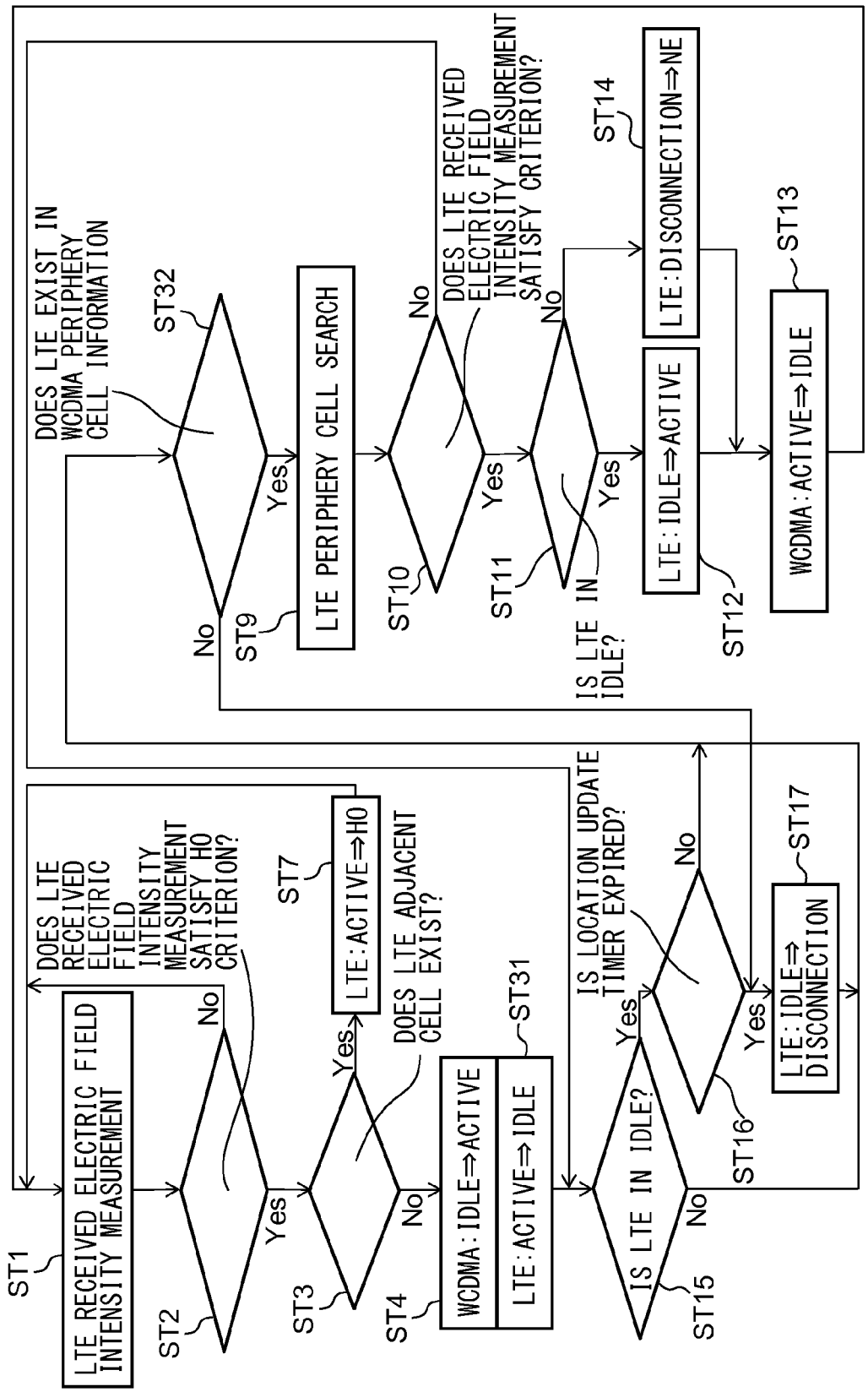
FIG. 12 is a flowchart for describing an example of processes of the control method of the wireless communication system in the third embodiment depicted in FIG. 10 and FIG. 11.

FIG. 12 is a flowchart for describing an example of processes of the control method of the wireless communication system in the third embodiment depicted in FIG. 10 and FIG. 11. Since the steps ST1 to ST4, ST7 and ST9 to ST17 in FIG. 12 have been illustrated in detail before with reference to FIG. 8, the illustration thereof is omitted.

As depicted in FIG. 12, when it is judged that the LTE adjacent cell does not exist at the step ST3, WCDMA is switched from idle to active at the step ST4, LTE is switched from active to idle at step ST31, and it proceeds to step ST15.

In FIG. 12, a step ST32 is provided before the step ST9 illustrated with reference to FIG. 8. Specifically, it proceeds to step ST32, when it is judged that LTE is not in an idle at the step ST15, when it is judged that the location update timer duration has not elapsed at the step ST16, or after changing LTE into a disconnection state from the idle at the step ST17.

At the step ST32, it is judged whether or not the periphery cell information from WCDMA includes LTE. Specifically, when it is judged that the periphery cell information from WCDMA includes LTE at the step ST32, it proceeds to step ST9 as is the case with the processing of FIG. 8 mentioned above.

On the other hand, when it is judged that the periphery cell information from WCDMA does not include LTE at the step ST32, it proceeds to step ST17 and changes LTE into the disconnection state from the idle. In other words, since it is found that LTE does not exist based on the periphery cell information from WCDMA, LTE is changed into the disconnection state, for example, without performing the LTE periphery cell search at the step ST9. Thereby, it may be possible to provide much more reduction of power consumption.

Figure 13:
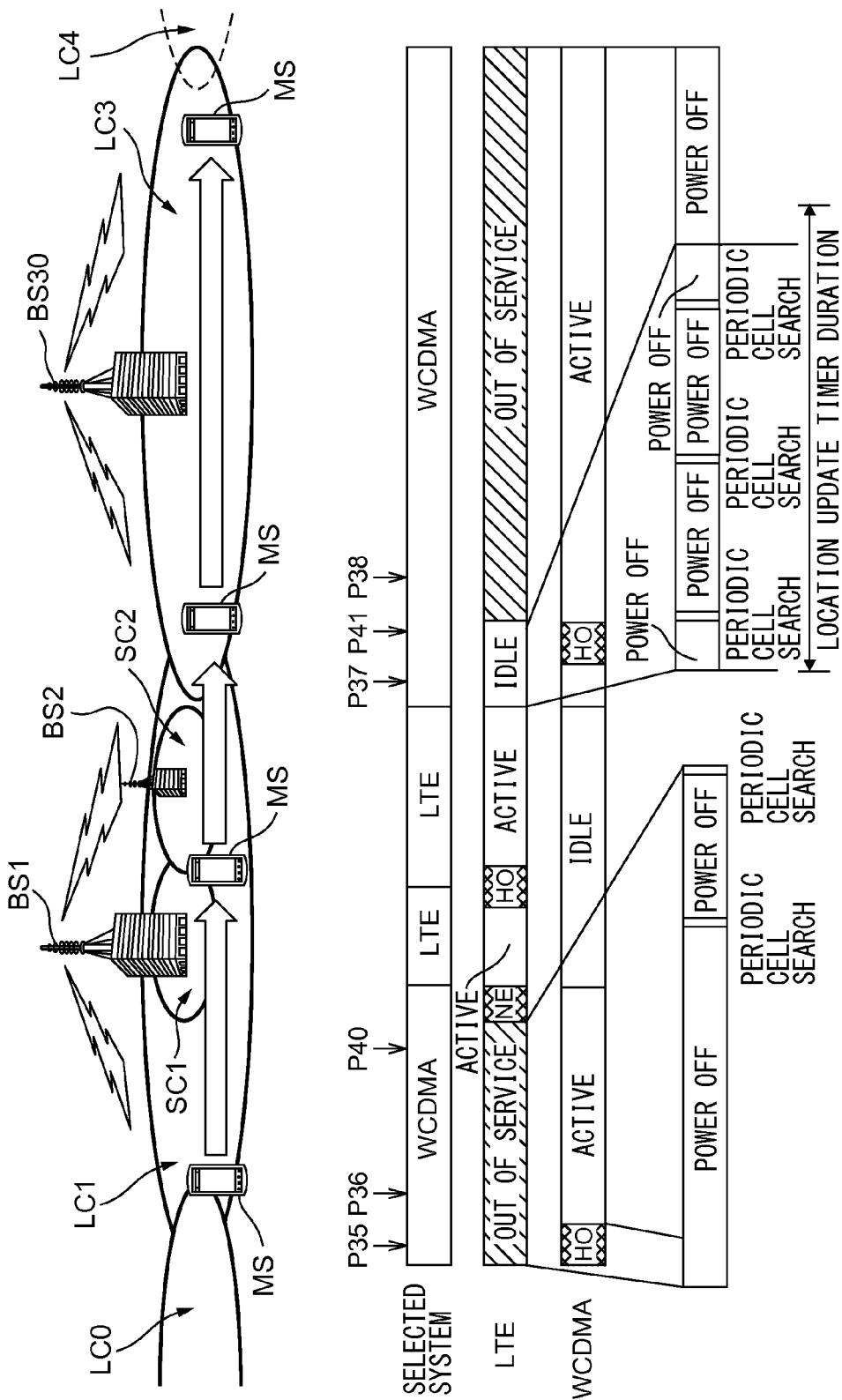
FIG. 13 is a drawing (first) for describing a fourth embodiment of the control method of the wireless communication system.
Figure 14:
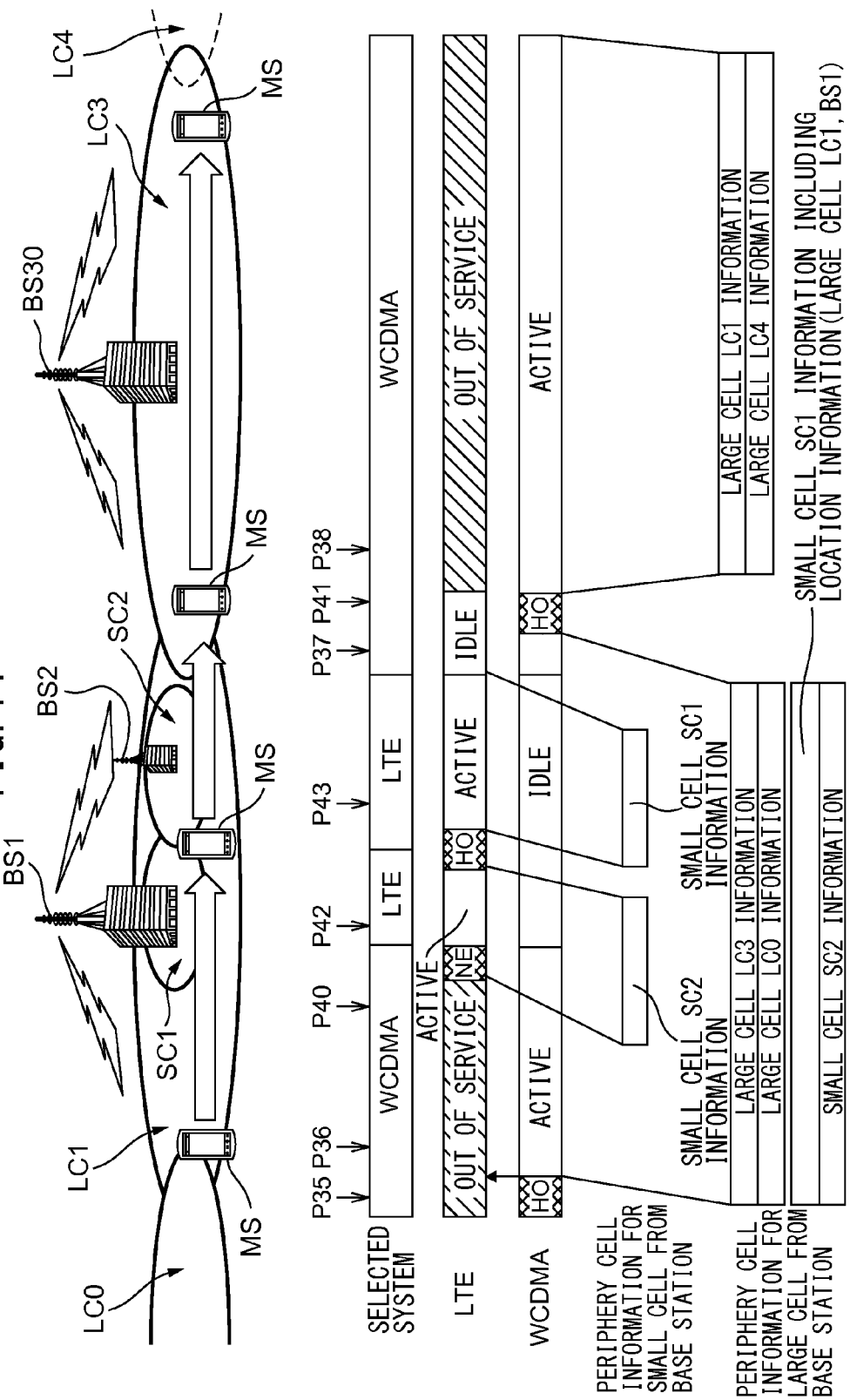
FIG. 14 is a drawing (second) for describing the fourth embodiment of the control method of the wireless communication system.
Figure 15:
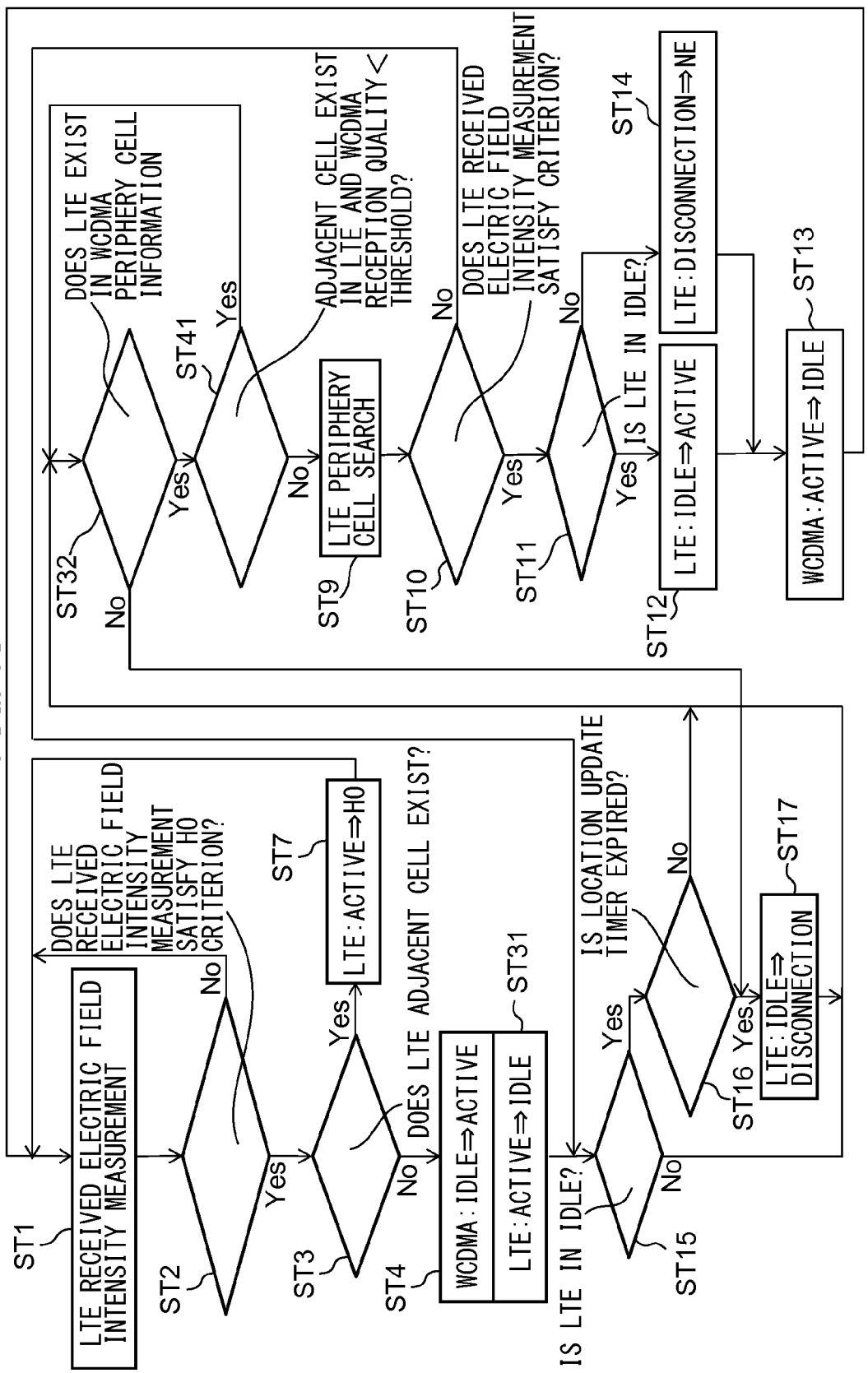
FIG. 15 is a flowchart for describing an example of processes of the control method of the wireless communication system in the fourth embodiment depicted in FIG. 13 and FIG. 14.

FIG. 13 and FIG. 14 are drawings for describing a fourth embodiment of the control method of the wireless communication system, and FIG. 15 is a flowchart for describing an example of processes of the control method of the wireless communication system in the fourth embodiment depicted in FIG. 13 and FIG. 14.

In the present fourth embodiment, a manner of utilizing the periphery cell information provided by the broadcast transmission according to WCDMA is different from the manner in the third embodiment mentioned above. Specifically, in the present fourth embodiment, it is supposed a case in which the broadcasted information represents that the base station with the small cell exists at the same place as the base station with the large cell to which a connection has been established, for example, a case in which one base station BS1 serves as both WCDMA of the large cell LC1, and LTE of the small cell SC1.

However, the matter that the base station with the small cell exists at the same place as the base station with the large cell does not limit the embodiment to a case in which one base station serves as the base station of the wireless communication systems for both the large cell and for the small cells, and the base stations for both systems may exist at the same place (substantially same place may be included) separately.

Note that, in FIG. 13 and FIG. 14, the base station 30 is a base station for only WCDMA of the large cell LC3, as is the case with FIG. 10 and FIG. 11. In the flowchart of the fourth embodiment depicted in FIG. 15, step ST41 is inserted between the step ST32 and the step ST9 in the third embodiment depicted in FIG. 12 mentioned above.

Specifically, as depicted in FIG. 13 and FIG. 14, when the mobile terminal MS is located at a position P35, the mobile terminal MS receives the periphery cell information by the broadcast transmission of WCDMA. Based on the periphery cell information, it is recognized that the small cell SC1 of the base station BS1 according to LTE is in large cell LC1 of the same base station according to WCDMA.

Further, when the mobile terminal MS has moved to a position P40 and the electric field intensity (the field intensity of WCDMA) of the connected cell LC1 exceeds a predetermined level, i.e. when the mobile terminal MS reaches the base station BS1 which is also according to WCDMA, the periodic cell search of LTE is started.

In other words, when RSSI (receiving signal strength) or CINR (carrier to interference and noise ratio) of the large cell LC1 of base station BS1 according to WCDMA satisfies a criterion, the periodic cell search of LTE is started. Thereby, it may be possible to provide a reduction of power consumption in comparison with a case of always performing the periodic cell search.

Then, when the mobile terminal MS is in the communication area of the small cell SC1 of the base station BS1 according to LTE, the network entry (NE) of LTE occurs and it switches from WCDMA to LTE. Since other processes are substantially same as the processes in each embodiment mentioned above, the illustration of the processing is omitted.

In FIG. 13, for example, when the mobile terminal MS has come to a position P41, since it has found that the system (LTE) of the small cell does not exist in a new large cell (LC3) before expiration of the location update timer duration, the periphery cell search is stopped and it proceeds to the processes for the out of service.

As depicted in FIG. 14, for example, when the mobile terminal MS is located at the position P42, the mobile terminal MS receives the information of the small cell SC2 of base station BS2 according to LTE from the base station BS1 with the small cell SC1 according to LTE as the periphery cell information.

Moreover, for example, when the mobile terminal MS is located at a position P43, the mobile terminal MS receives the information of the small cell SC1 of the base station BS1 according to LTE from the base station BS2 with the small cell SC2 according to LTE as the periphery cell information.

Further, for example, when the mobile terminal MS is located at a position P36, the mobile terminal MS receives the information of the large cell LC0, the information of the large cell LC3, the information of the small cell SC1 (LC1, BS1) including position information and the information of the small cell SC2, from the base station BS1 as the periphery cell information.

Then, for example, when the mobile terminal MS is located at a position P38, the mobile terminal MS receives the information of the large cell LC1 and the information of the large cell LC4 from the base station BS30 as the periphery cell information.

In this way, when the broadcasted information represents that the base station with the small cell exists at the same place as the base station with the large cell to which a connection has been established in the third embodiment mentioned above, the fourth embodiment performs the periphery cell search, when the received electric field intensity of the connected cell exceeds a predetermined level. In other words, the periphery cell search for the LTE system of the small cell in an idle or out of service is performed.

As mentioned above, in the flowchart of FIG. 15, step ST41 is inserted between the step ST32 and the step ST9 in FIG. 12. As depicted in FIG. 15, when it is judged that the periphery cell information from WCDMA includes LTE at the step ST32, it proceeds to step ST41.

At the step ST41, it is judged whether or not an adjacent cell exists for LTE and the reception quality of WCDMA is lower than a threshold. When it is judged that the adjacent cell exists for LTE but the reception quality of WCDMA is lower than the threshold at the step ST41, it returns to the step ST32 and repeats above-mentioned processing.

On the other hand, at the step ST41, when it is judged that the adjacent cell exists for LTE and the reception quality of WCDMA is not lower (is higher) than the threshold, i.e. it is judged that the mobile terminal MS has come close to the base station BS1 which is common to LTE and WCDMA, it proceeds to step ST9.

Then, the periphery cell search for LTE is performed at the step ST9, it proceeds to step ST10, and processing subsequent to the step ST10 mentioned above is performed. In this way, the periphery cell search for LTE is performed only when the mobile terminal MS is close to the base station BS1 according to LTE (and WCDMA), and thereby it is possible to further reduce the power consumption.

FIG. 16 to FIG. 19 are drawings for describing the fifth embodiment of the control method of the wireless communication system, and depict a case in which the information which may discriminate the adjacent cell and the neighboring cell is transmitted by the periphery cell information provided by the broadcast transmission according to the system (LTE) of the small cell.

Figure 16:
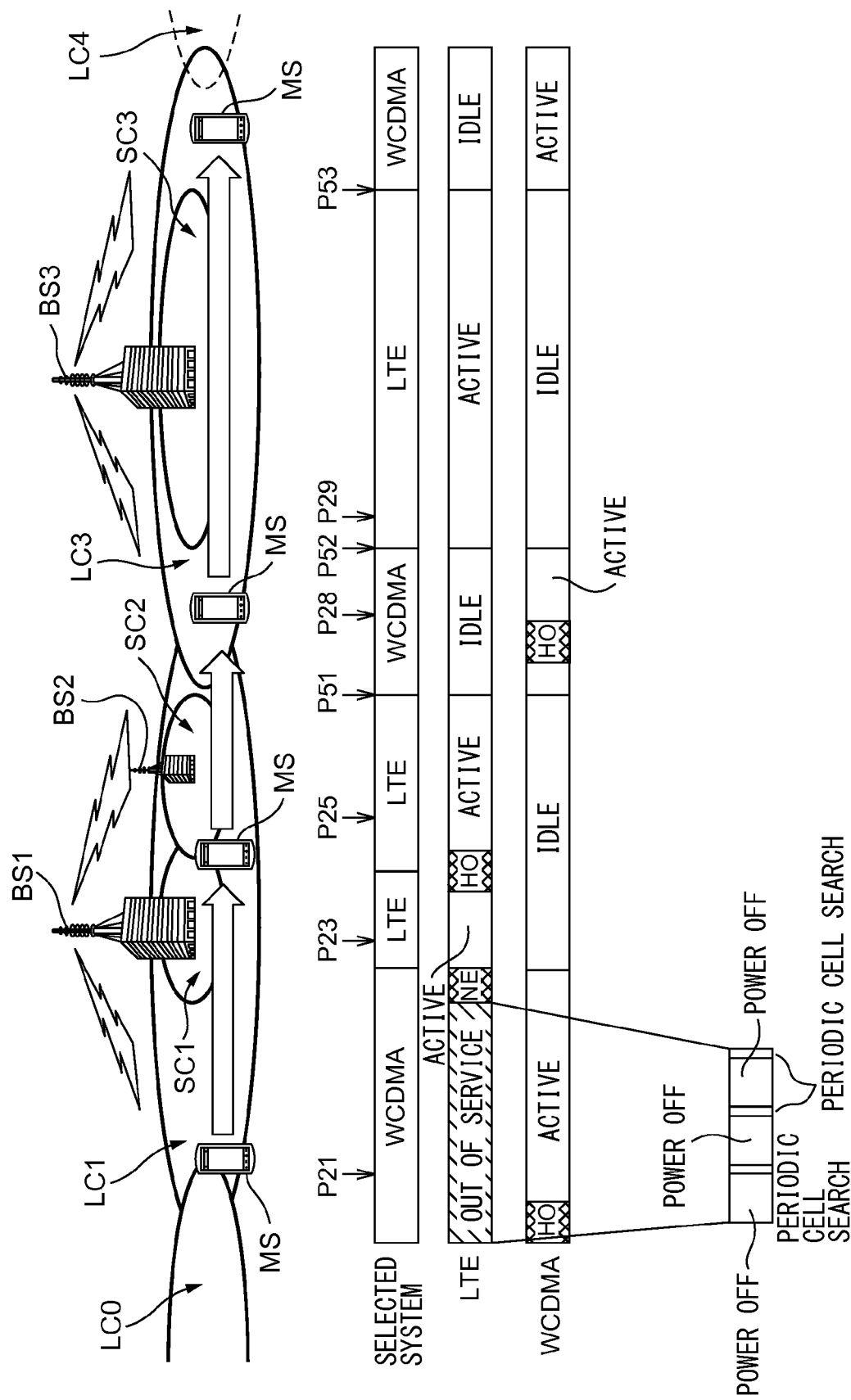
FIG. 16 is a drawing (first) for describing a fifth embodiment of the control method of the wireless communication system.
Figure 17:
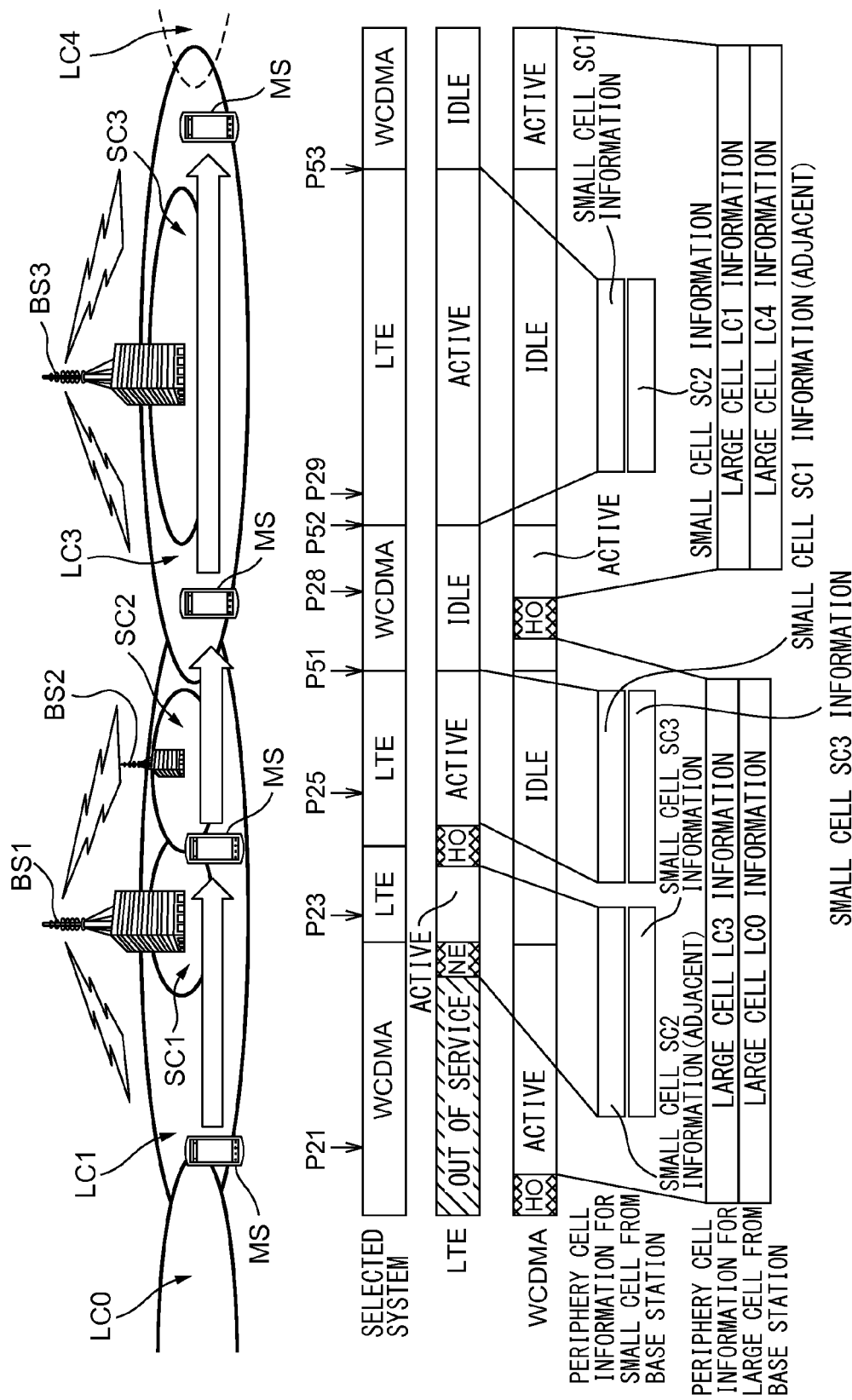
FIG. 17 is a drawing (second) for describing the fifth embodiment of the control method of the wireless communication system.
Figure 18:
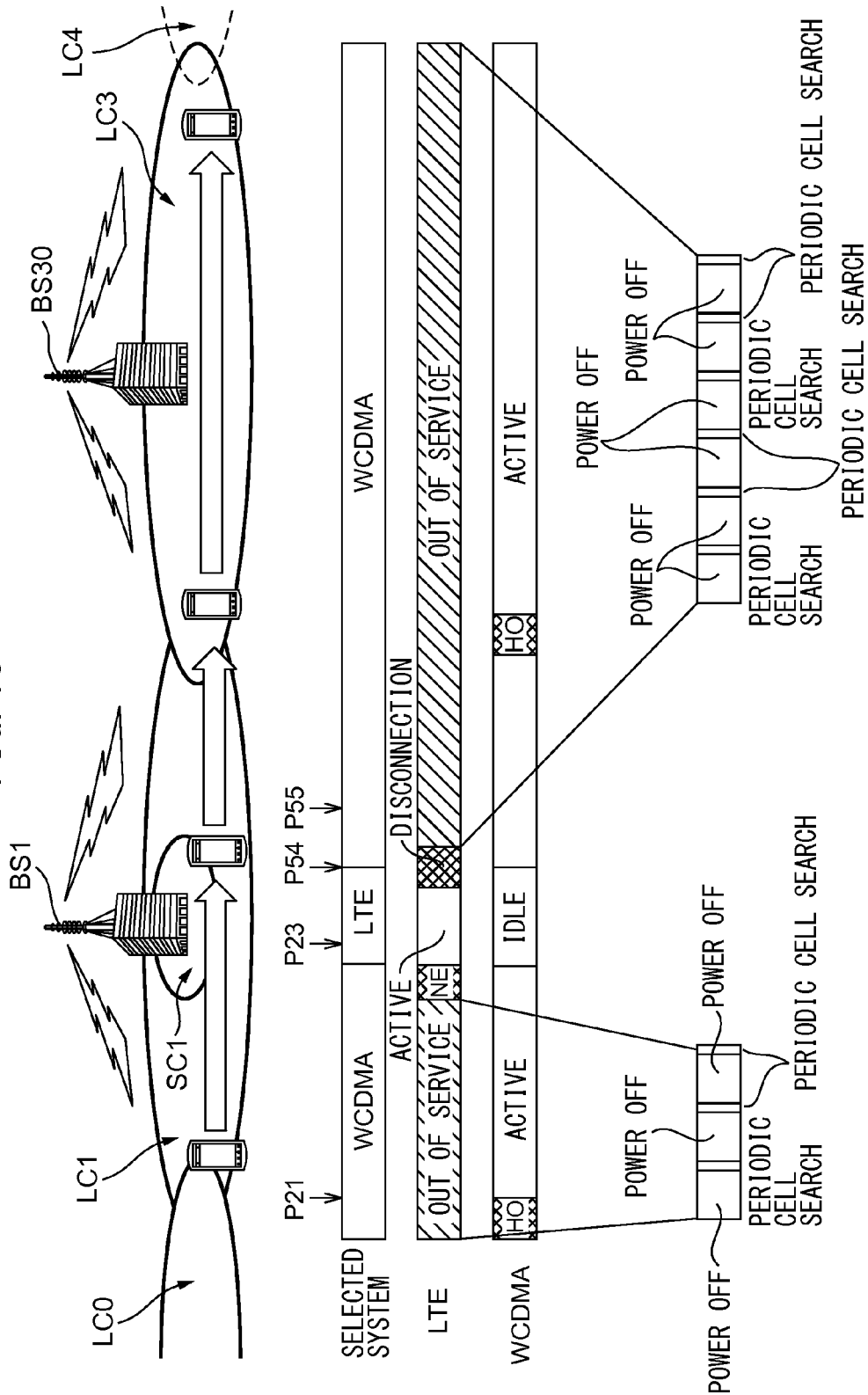
FIG. 18 is a drawing (third) for describing the fifth embodiment of the control method of the wireless communication system.
Figure 19:
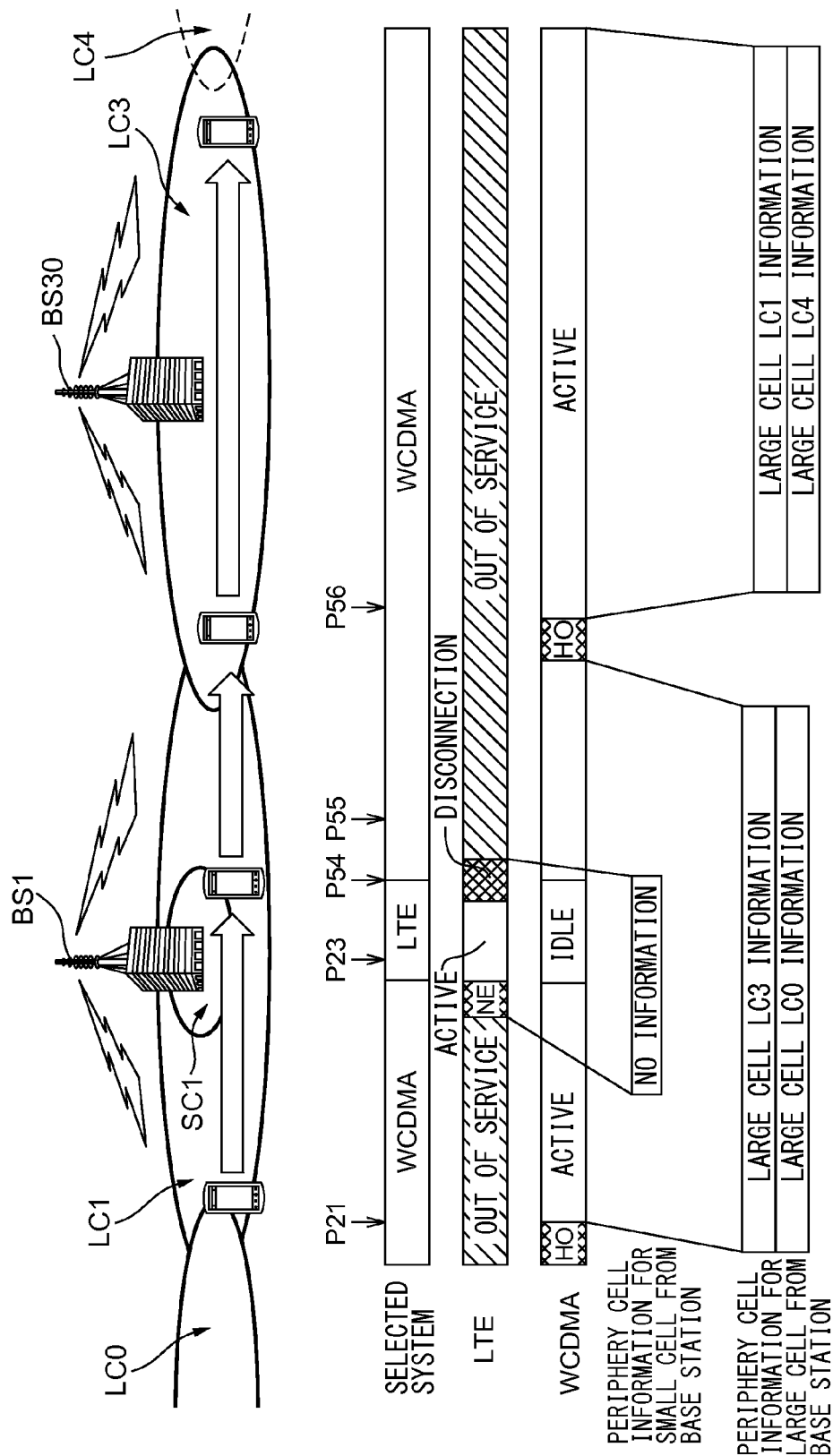
FIG. 19 is a drawing (fourth) for describing the fifth embodiment of the control method of the wireless communication system.

FIG. 16 and FIG. 17 depict examples of cases in which the periphery cell information provided by the broadcast transmission according to LTE includes the adjacent cell and the neighboring cell, and FIG. 18 and FIG. 19 depict examples of cases in which the periphery cell information provided by the broadcast transmission according to LTE does not include the adjacent cell and the neighboring cell.

Therefore, FIG. 16 and FIG. 17 include, for example, the base stations BS1, BS2 and BS3, the small cells SC1, SC2 and SC3, and the large cells LC0, LC1 and LC3, as is the case with FIG. 6 in the first embodiment mentioned above.

First, as depicted in FIG. 16 and FIG. 17, when the mobile terminal MS is located at a position P51, the mobile terminal MS receives the periphery cell information (broadcast information) provided by the broadcast transmission according to LTE, the idle processing is performed since the adjacent cell and the neighboring cell are included in the broadcast information.

When the mobile terminal MS has moved to a position P52, since the neighboring base station is found before expiration of the location update timer duration, the base station is activated and switching to LTE from WCDMA is performed. Further, when the mobile terminal MS has moved to a position P53, the idle processing is performed since the neighboring cell is included in the broadcast information on LTE.

As depicted in FIG. 17, for example, when the mobile terminal MS is located at the position P21, the mobile terminal MS receives the information of the large cell LC0 and the information of the large cell LC3 from the base station BS1 with the large cell LC1 according to WCDMA as the periphery cell information.

For example, when the mobile terminal MS is located at a position P28, the mobile terminal MS receives the information of the large cell LC1 and the information of the large cell LC4 from the base station BS3 with the large cell LC3 according to WCDMA as the periphery cell information.

Further, as depicted in FIG. 17, for example, when the mobile terminal MS is located at the position P23, the mobile terminal MS receives the information (adjacent) of the small cell SC2 and the information (neighboring) of the small cell SC3 from the base station BS1 with the small cell SC1 according to LTE as the periphery cell information. Note that the periphery cell information includes not only the adjacent cell SC2 that borders the cell SC1 which is actually communicating but also the information of the neighboring cell SC3 which is close to the cell SC1 but does not border the cell SC1.

Moreover, for example, when the mobile terminal MS is located at a position P25, the mobile terminal MS receives the information (adjacent) of the small cell SC1 and the information (neighboring) of the small cell SC3 from the base station BS2 with the small cell SC2 according to LTE as the periphery cell information.

Next, FIG. 18 and FIG. 19 correspond to, for example, ones in which the base station BS2 is further excluded from FIG. 13 and FIG. 14 of the fourth embodiment mentioned above, and includes the base stations BS1 and BS30, the small cell SC1, the large cells LC0, LC1 and LC3.

FIG. 18 and FIG. 19 depict three large cells LC0, LC1 and LC3, as is the case with FIG. 16 and FIG. 17, but depict only one small cell SC1. As depicted in FIG. 18 and FIG. 19, when the mobile terminal MS is located at a position P54, the mobile terminal MS recognizes that there is no small cell (no information) according to LTE which is adjacent to/neighboring the cell based on the broadcast transmission of LTE.

This results in the switching to WCDMA from LTE when the mobile terminal MS has come to a position P54, i.e. the switching to the large cell LC1 of the base station BS1 according to WCDMA from the small cell SC1 of the base station BS1 according to LTE is performed, and the disconnection processing is performed on the LTE. Therefore, for example, the mobile terminal MS located at the position P54 performs the processes for the out of service of LTE, i.e. the periodic cell search.

As depicted in FIG. 19, for example, when the mobile terminal MS is located at the position P21, the mobile terminal MS receives the information on large cell LC0, and the information on large cell LC3 from base station BS1 of large cell LC1 according to WCDMA as periphery cell information.

For example, when the mobile terminal MS is located at the position P56, the mobile terminal MS receives the information of the large cell LC1 and the information of the large cell LC4 from the base station BS30 with the large cell LC3 according to WCDMA as the periphery cell information.

Further, as depicted in FIG. 19, for example, when the mobile terminal MS is located at the position P23, the mobile terminal MS receives the information that there is no small cell according to LTE (no information), as the periphery cell information from the base station BS1 with the small cell SC1 according to LTE.

In this way, according to the fifth embodiment, when there is no adjacent cell which may perform a handover and a neighboring cell is included in the periphery cell information, the system in the base station connected currently becomes in an idle (idle mode), and is switched to another system. Note that when the neighboring cell is not set, the system does not become in an idle but the disconnection processing is performed.

Figure 20:
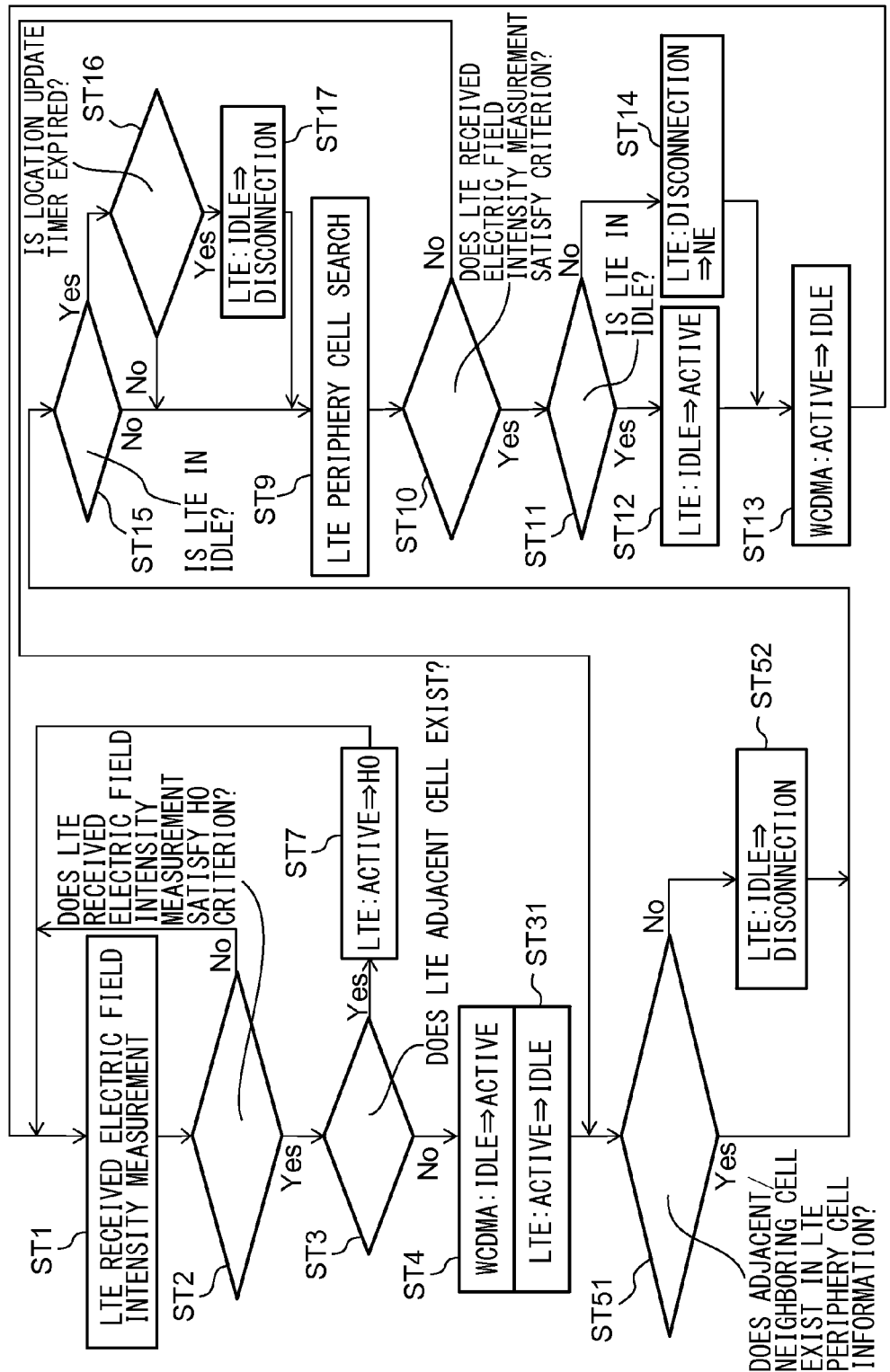
FIG. 20 is a flowchart for describing an example of processes of the control method of the wireless communication system in the fifth embodiment depicted in FIG. 16 to FIG. 19.

FIG. 20 is a flowchart for describing an example of processes of the control method of the wireless communication system in the fifth embodiment depicted in FIG. 16 to FIG. 19. As is clear from the comparison between FIG. 20 and above-mentioned FIG. 12, in the flowchart of the fifth embodiment depicted in FIG. 20, steps ST51 and ST52 are inserted between the step ST31 and the step ST15 in the third embodiment of FIG. 12.

When it is judged that the LTE received electric field intensity does not satisfy the criterion at the step ST10, it does not proceed to step ST15 immediately, but proceeds to step ST51.

In other words, as depicted in FIG. 20, it proceeds to step ST51, after switching LTE from active to idle at step ST31 and when it is judged that the LTE received electric field intensity does not satisfy the criterion at the step ST10. At the step ST51, it is judged whether or not the adjacent cell or the neighboring cell is included in the LTE periphery cell information.

When it is judged that the adjacent cell or the neighboring cell is included in the LTE periphery cell information at step ST51, it proceeds to step ST15 to judge whether or not LTE is in an idle, and processes substantially same as above-mentioned processes are performed.

On the other hand, when it is judged that the adjacent cell or the neighboring cell are not included in the LTE periphery cell information at step ST51, it proceeds to step ST52 and disconnects LTE in an idle. The disconnection processing corresponds to processing at the position P54 in FIG. 18 and FIG. 19, for example. Thereby, LTE repeats the processes for the out of service, i.e. the periodic cell search.

FIG. 21 to FIG. 24 are drawings for describing a sixth embodiment of the control method of the wireless communication system. The sixth embodiment transmits, for example, the information of LTE of the small cell in the communication area of the large cell with the periphery cell information provided by the broadcast transmission from the base station with the large cell according to WCDMA.

Figure 21:
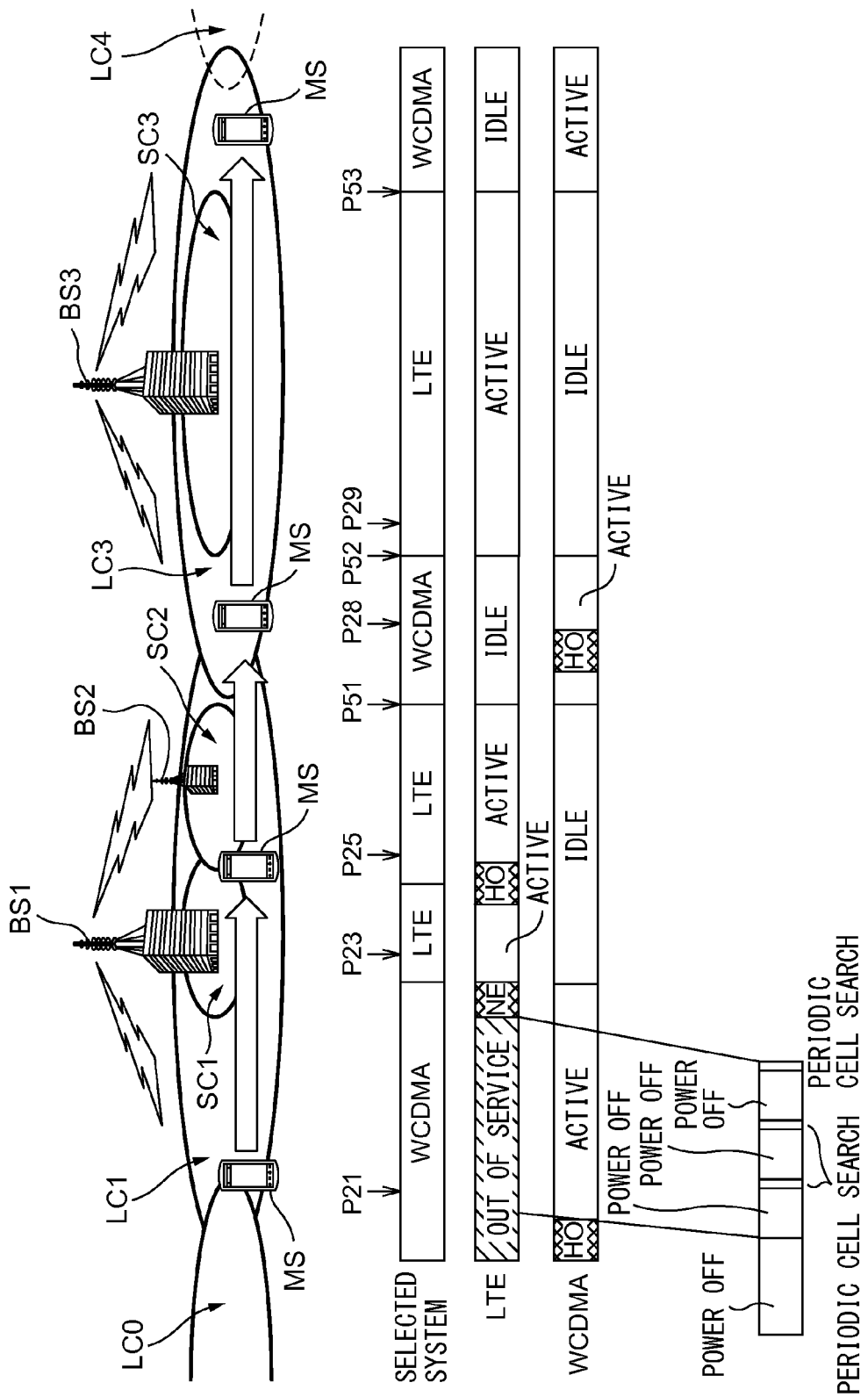
FIG. 21 is a drawing (first) for describing a sixth embodiment of the control method of the wireless communication system.
Figure 22:
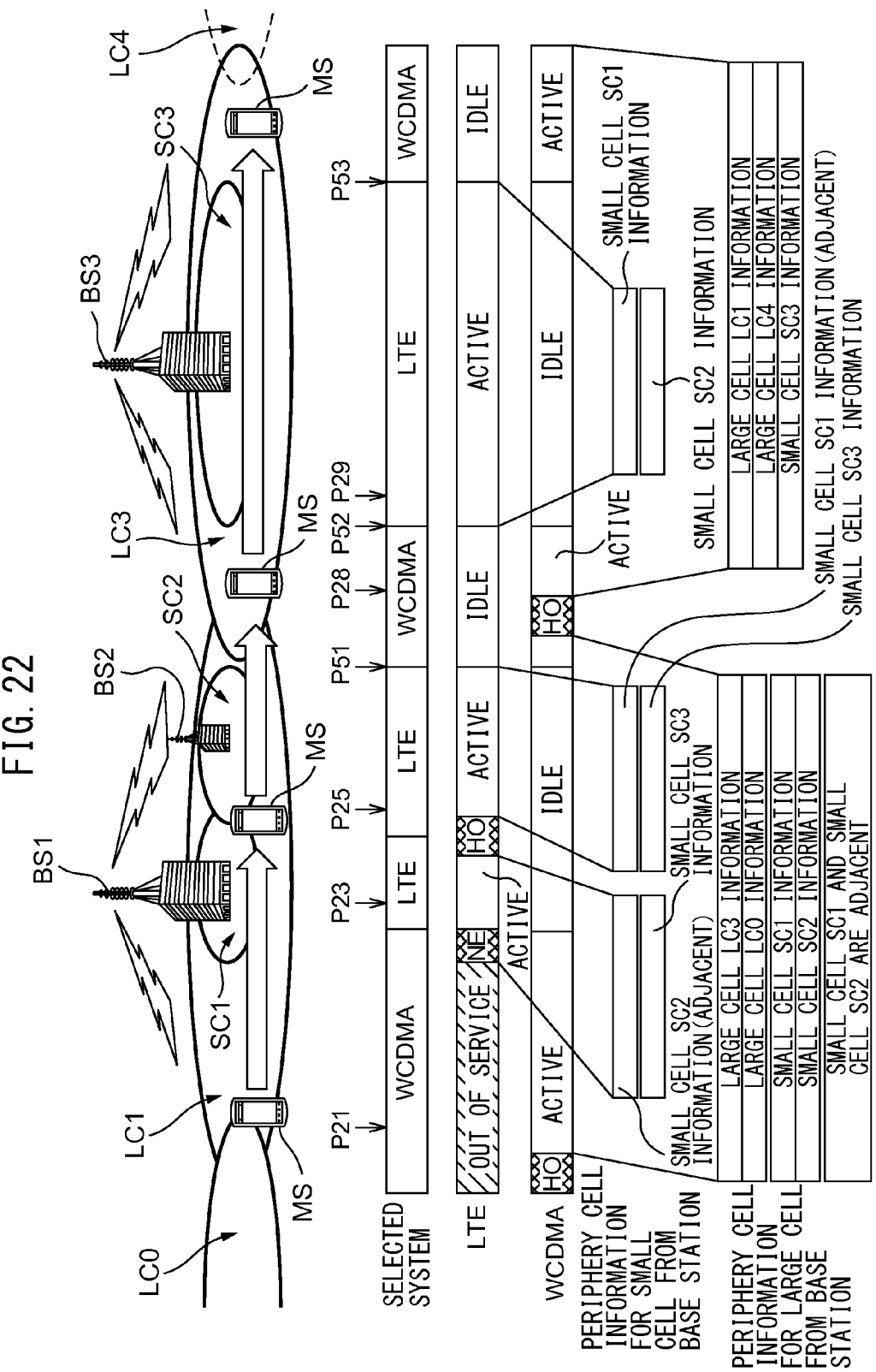
FIG. 22 is a drawing (second) for describing the sixth embodiment of the control method of the wireless communication system.
Figure 23:
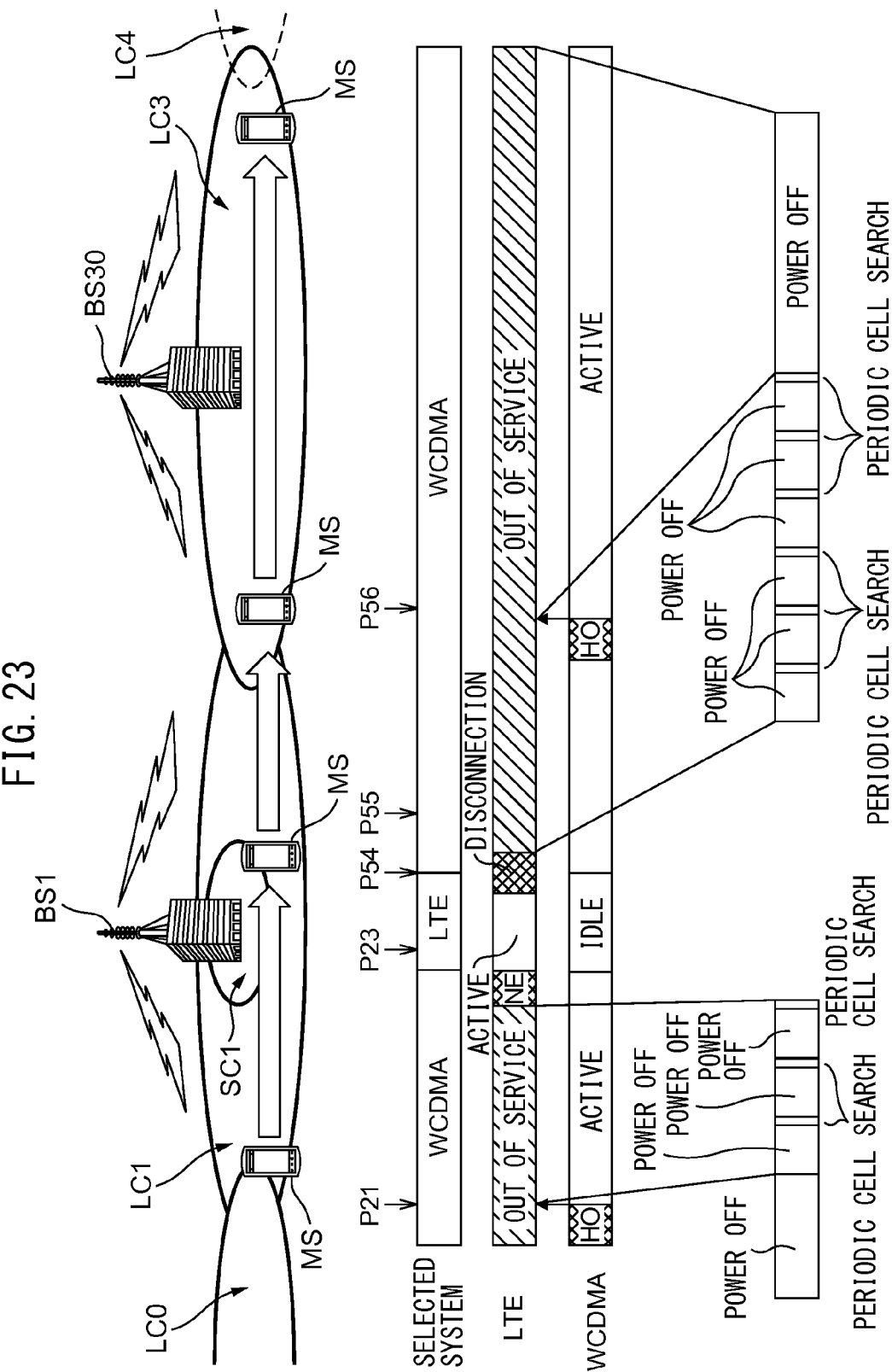
FIG. 23 is a drawing (third) for describing the sixth embodiment of the control method of the wireless communication system.
Figure 24:
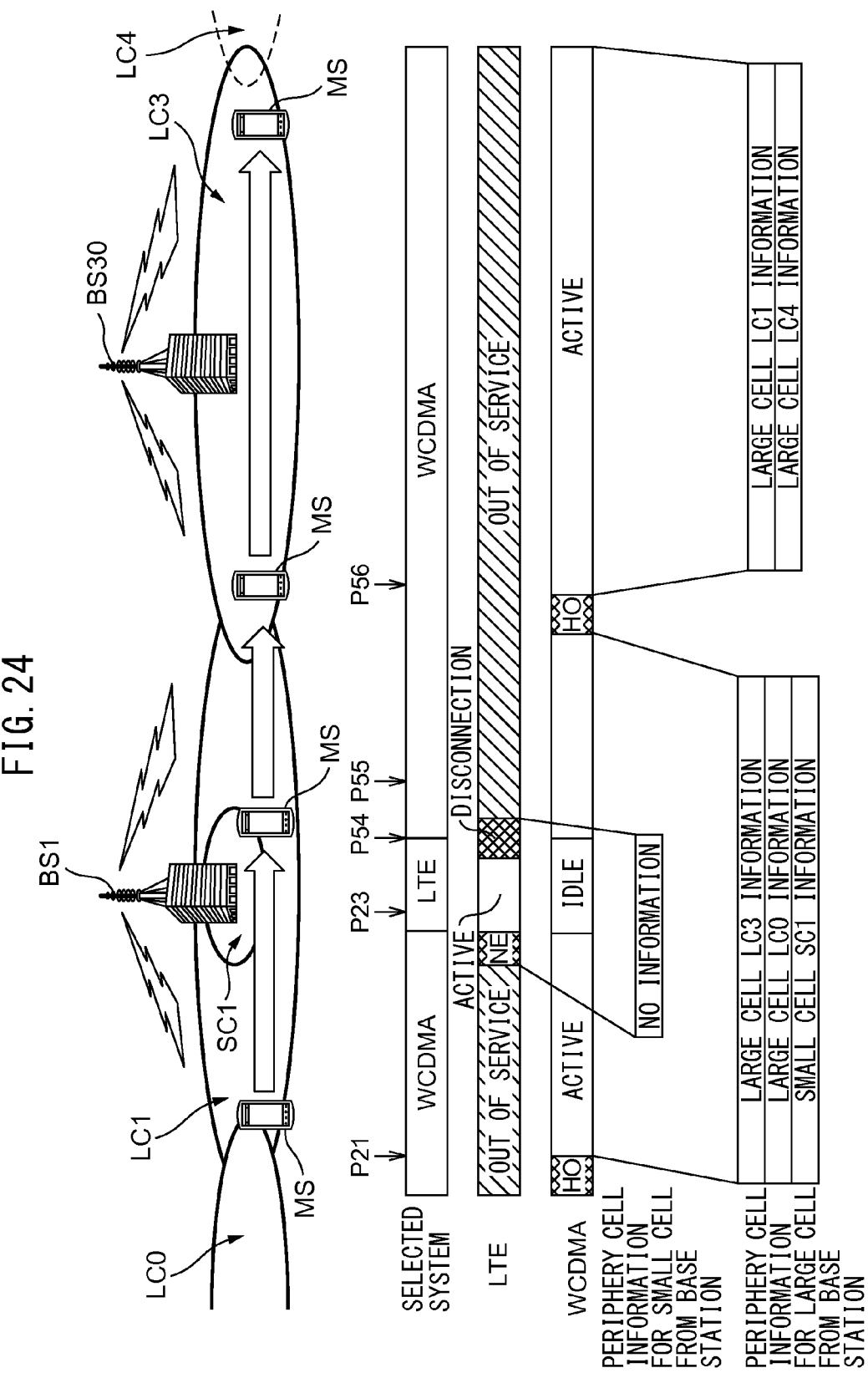
FIG. 24 is a drawing (fourth) for describing a sixth embodiment of the control method of the wireless communication system.

FIG. 21 and FIG. 22 depict examples of cases in which the periphery cell information provided by the broadcast transmission according to LTE includes the adjacent cell and the neighboring cell, and FIG. 23 and FIG. 24 depict examples of cases in which the periphery cell information provided by the broadcast transmission according to LTE does not include the adjacent cell and the neighboring cell.

As is clear from the comparison between FIG. 22 and above-mentioned FIG. 17, in the sixth embodiment, for example, when the mobile terminal MS is located at the position P21, the mobile terminal MS receives not only the information of the large cell but also the information of the small cell from the base station BS1 with the large cell LC1 as the periphery cell information.

In other words, as depicted in FIG. 22, for example, when the mobile terminal MS is located at the position P21, the mobile terminal MS receives the information of the large cell LC3, the information of the large cell LC0, the information of the small cell SC1, and the information of the small cell SC2 from the base station BS1 with the large cell LC1 as the periphery cell information. Further, the mobile terminal MS receives the information indicating that the small cell SC1 and the small cell SC2 are adjacent to each other as the periphery cell information.

For example, when the mobile terminal MS is located at the position P28, the mobile terminal MS receives the information of the large cell LC1, the information of the large cell LC4, and the information of the small cell SC3 from the base station BS3 with the large cell LC3 according to WCDMA as the periphery cell information.

Thereby, as is clear from the comparison between FIG. 21 and FIG. 16, for example, the interval of the periodic cell search performed by LTE outside the service area is made to a short period (P21), i.e. the timing for starting the periodic cell search is delayed, and thereby it is possible to further reduce the power consumption.

Further, as is clear from the comparison between FIG. 24 and above-mentioned FIG. 19, in the sixth embodiment, for example, when the mobile terminal MS is located at the position P21, the mobile terminal MS receives not only the information of the large cell but also the information of the small cell from the base station BS1 with the large cell LC1 as the periphery cell information.

In other words, as depicted in FIG. 24, for example, when the mobile terminal MS is located at the position P21, the mobile terminal MS receives the information of the large cell LC3, the information of the large cell LC0, and the information of the small cell SC1 from the base station BS1 with the large cell LC1 as the periphery cell information.

However, when the mobile terminal MS is located at the position P56 for example, as is the case with above-mentioned FIG. 19, the mobile terminal MS receives the information of the large cell LC1 and the information of the large cell LC4 from the base station BS30 with the large cell LC3 according to WCDMA as the periphery cell information.

Further, as depicted in FIG. 24, for example, when the mobile terminal MS is located at the position P23, as is the case with above-mentioned FIG. 19, the mobile terminal MS receives the information that there is no small cell according to LTE (no information), as the periphery cell information from the base station BS1 with the small cell SC1 according to LTE.

Thereby, as is clear from the comparison between FIG. 23 and FIG. 18, for example, the interval of the periodic cell search performed by LTE outside the service area is made to a short period (P56), i.e. the timing for finishing the periodic cell search is hastened, and thereby it is possible to further reduce the power consumption.

In other words, according to the present sixth embodiment, the information of the small cell in the communication area of the large cell is transmitted with the periphery cell information provided by the broadcast transmission from the base station with the large cell according to WCDMA, to optimize the idle of LTE of the small cell and the cell search outside of the service area, and thereby it is possible to suppress an increase of wasteful power consumption.

Figure 25:
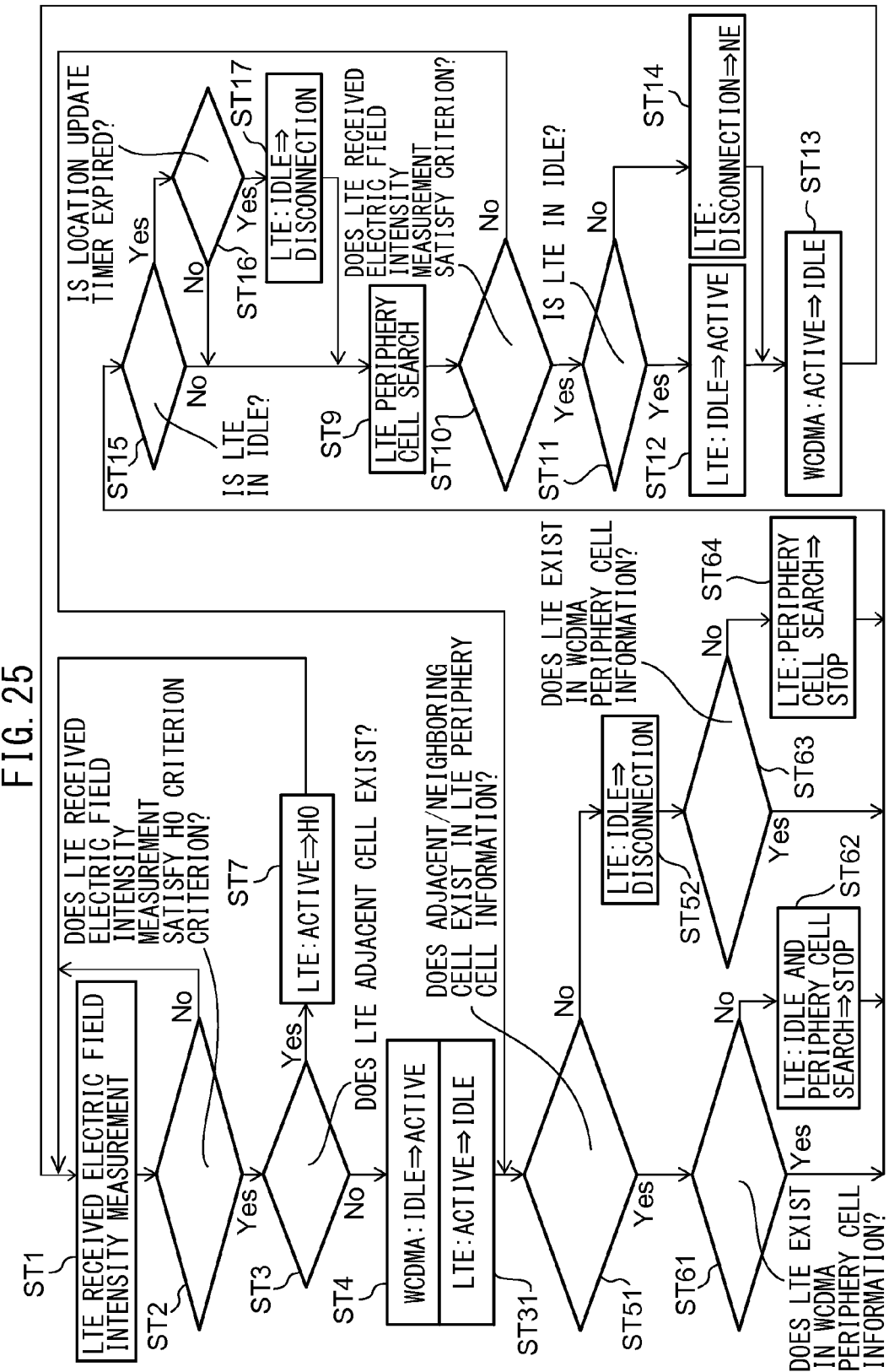
FIG. 25 is a flowchart for describing an example of processes of the control method of the wireless communication system in the sixth embodiment depicted in FIG. 21 to FIG. 24.

FIG. 25 is a flowchart for describing an example of processes of the control method of the wireless communication system in the sixth embodiment depicted in FIG. 21 to FIG. 24. As is clear from the comparison between FIG. 25 and above-mentioned FIG. 20, in the flowchart of the sixth embodiment depicted in FIG. 25, steps ST61 to ST64 are inserted between the steps ST51, ST52 and the step ST15 in the fifth embodiment depicted in FIG. 20.

Specifically, as depicted in FIG. 25, when it is judged that the adjacent cell or the neighboring cell are included in the LTE periphery cell information at the step ST51, it proceeds to step ST61 and it is judged whether or not LTE is included in the periphery cell information of WCDMA.

When it is judged that LTE is not included in the periphery cell information of WCDMA at step ST61, it proceeds to step ST62 to stop the idle of LTE and the periphery cell search, and it proceeds to step ST15. When it is judged that LTE is included in the periphery cell information of WCDMA at step ST61, it proceeds to step ST15.

On the other hand, when it is judged that the adjacent cell or the neighboring cell are not included in the LTE periphery cell information at the step ST51, it proceeds to step ST52 to disconnect LTE in an idle, and it proceeds to step ST63 to judge whether or not LTE is included in the periphery cell information of WCDMA.

When it is judged that LTE is not included in the periphery cell information of WCDMA at step ST63, it proceeds to step ST64 to stop the periphery cell search of LTE, and it proceeds to step ST15. When it is judged that LTE is included in the periphery cell information of WCDMA at step ST63, it proceeds to step ST15.

In this way, in the sixth embodiment, the periphery cell information provided by the broadcast transmission from the base station with the large cell of WCDMA includes the information of the small cell in the communication area of the large cell, and the steps ST61 and ST63 judge the existence of the small cell of LTE in the periphery cell information.

Then, when it is judged that LTE is not included in the periphery cell information of WCDMA at steps ST61 and ST63, the periphery cell search of LTE is stopped at the steps ST62 and ST64, and thereby it is possible to further reduce the power consumption.

Note that a processing of the stop of the periphery cell search (stop of the periodic cell search) at the step ST64 corresponds to a processing at the position P56 in FIG. 23 and FIG. 25, for example. In this way, by stopping a dispensable cell search in the processes for the out of service of LTE, it may be possible to provide much more reduction of power consumption.

Figure 26:
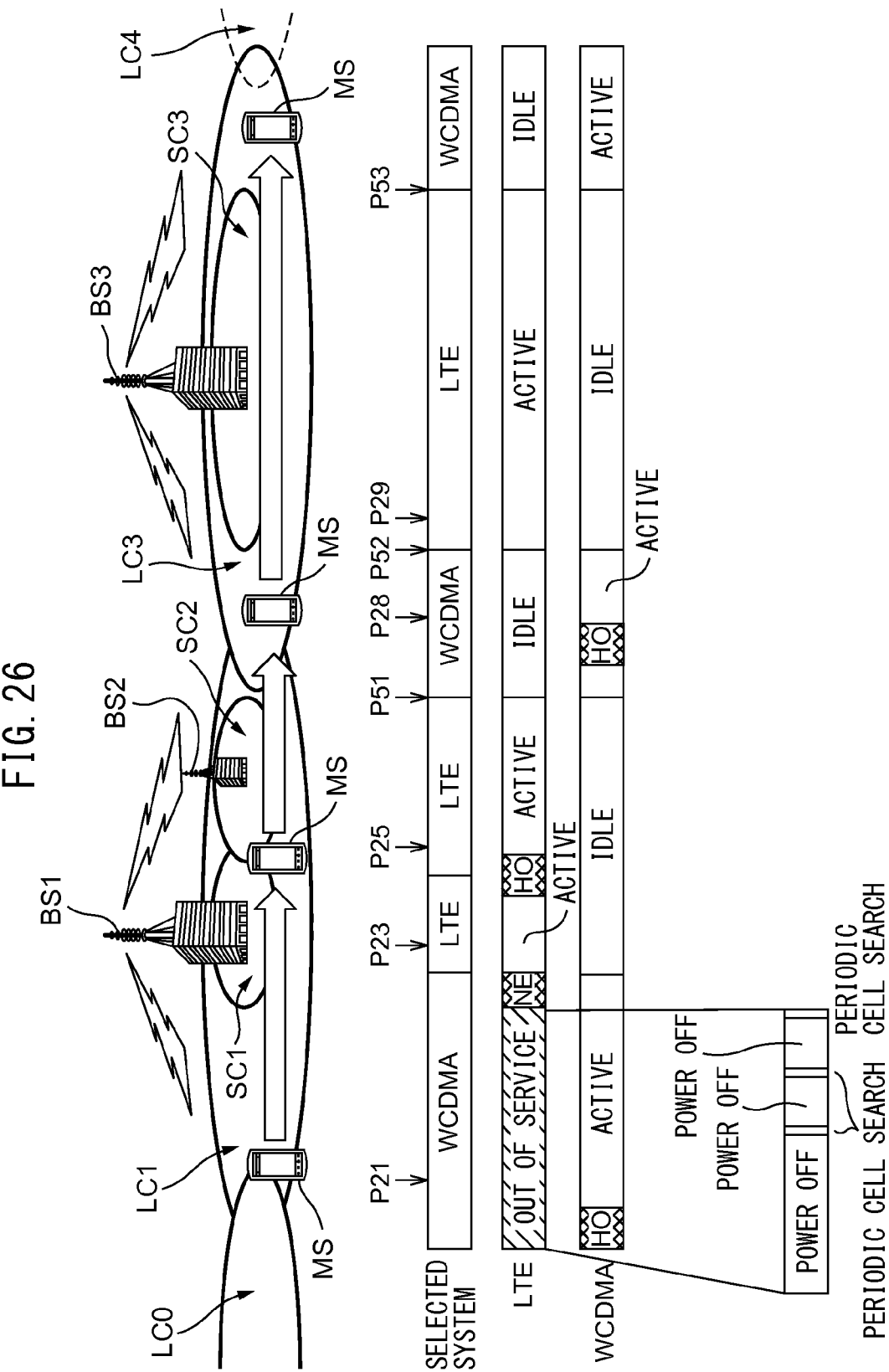
FIG. 26 is a drawing (first) for describing a seventh embodiment of the control method of the wireless communication system.
Figure 27:
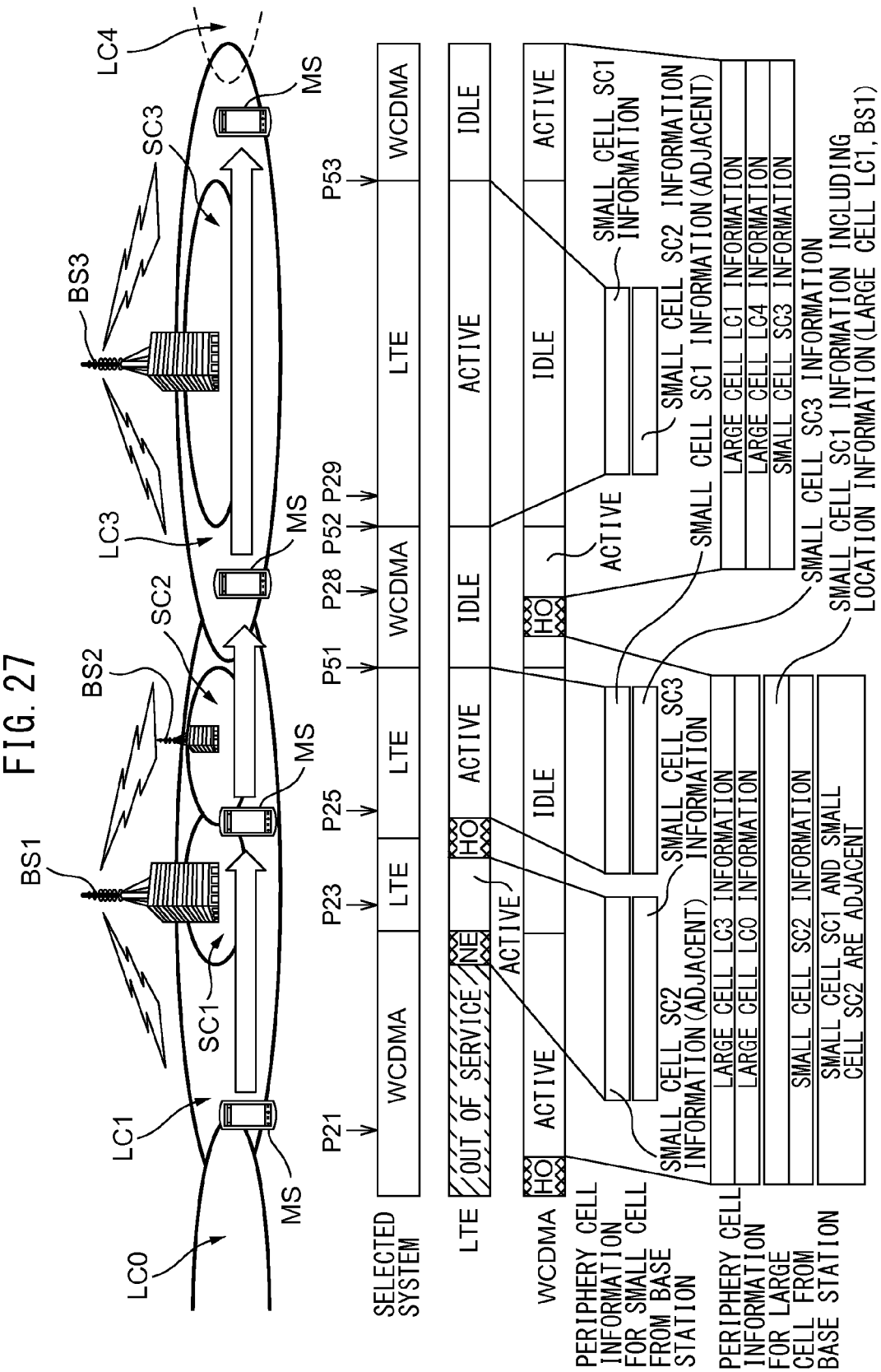
FIG. 27 is a drawing (second) for describing the seventh embodiment of the control method of the wireless communication system.
Figure 28:
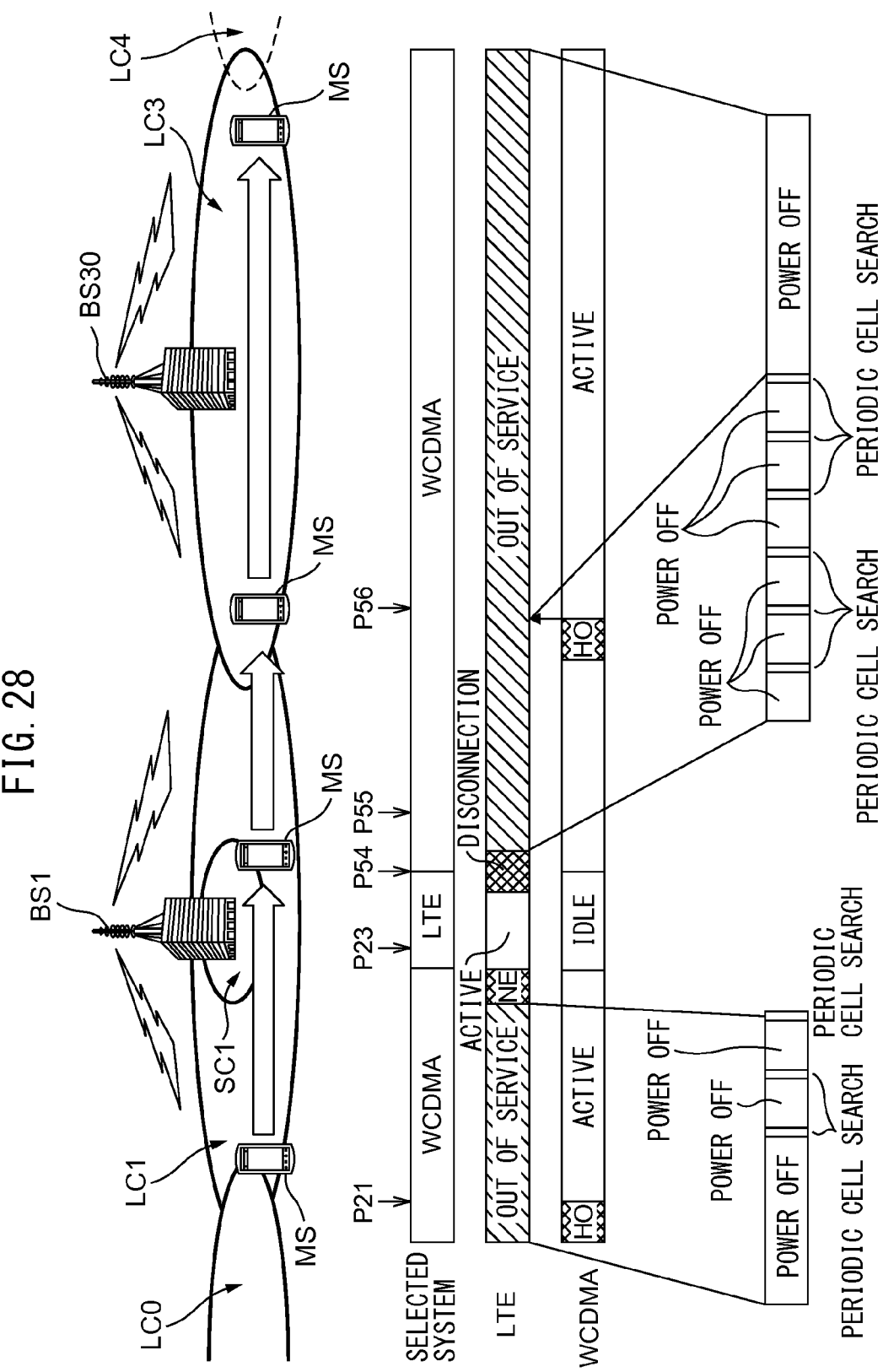
FIG. 28 is a drawing (third) for describing the seventh embodiment of the control method of the wireless communication system.

FIG. 26 to FIG. 28 are drawings for describing a seventh embodiment of the control method of the wireless communication system. The seventh embodiment transmits, as is the case with the above-mentioned sixth embodiment, for example, the information of LTE of the small cell in the communication area of the large cell with the periphery cell information provided by the broadcast transmission from the base station with the large cell according to WCDMA.

The seventh embodiment relates to a case in which a fact that the base station with the small cell exists at the same place as the base station with the large cell which is communicating actually is broadcasted, for example relates to a case in which the connected base station of WCDMA is also the base station of LTE.

Specifically, in the seventh embodiment, only when the received electric field intensity of the connected cell exceeds a predetermined level, the periphery cell search by the LTE system is performed for the small cell in an idle or in the out of service.

FIG. 26 and FIG. 27 depict examples of cases in which the periphery cell information provided by the broadcast transmission according to LTE includes the adjacent cell and the neighboring cell, and FIG. 28 and FIG. 29 depict examples of cases in which the periphery cell information provided by the broadcast transmission according to LTE does not include the adjacent cell and the neighboring cell.

First, in the seventh embodiment, the information of LTE of the small cell SC1 in the communication area of the large cell LC1 is transmitted with the periphery cell information provided by the broadcast transmission from the base station BS1 with the large cell LC1 according to WCDMA. In the seventh embodiment, the periphery cell information includes the position information of the small cell SC1.

Specifically, as is clear from the comparison between FIGS. 27, 29 and above-mentioned FIGS. 22, 24, in the seventh embodiment, for example, it may be recognized that WCDMA of the large cell LC1 and LTE of the small cell SC1 are served by the same base station BS1.

Thereby, as depicted in FIG. 26 and FIG. 28, the periphery cell search may be stopped until the electric field intensity of WCDMA in the large cell LC1 becomes stronger than a reference value, and it is possible to further reduce the power consumption.

FIG. 30 is a flowchart for describing an example of processes of the control method of the wireless communication system in the seventh embodiment depicted in FIG. 26 to FIG. 29. As is clear from the comparison between FIG. 30 and above-mentioned FIG. 25, in the flowchart of the seventh embodiment of FIG. 30, step ST71 is inserted between the steps ST15 to ST17 and the step ST9 in the sixth embodiment of FIG. 25.

Specifically, each of steps ST61 to ST64 in the sixth embodiment illustrated with reference to FIG. 25 is processed, and it proceeds to step ST15 to judge whether or not LTE is in an idle. When it is judged that LTE is not in an idle at the step ST15, it proceeds to step ST71.

When it is judged that LTE is in an idle at the step ST15, it proceeds to step ST16 and it is judged whether or not the location update timer has expired. When it is judged that the location update timer has not expired, i.e. that the location update timer duration has not elapsed at step ST16, it proceeds to step ST71.

Further, when it is judged that the location update timer duration has elapsed at step ST16, it proceeds to step ST17 and LTE is changed into a disconnection state from an idle, and after that it proceeds to step ST71.

At step ST71, it is judged whether or not the adjacent cell exists in LTE and the reception quality of WCDMA is lower than a threshold. When it is judged that the adjacent cell exists in LTE but the reception quality of WCDMA is lower than the threshold at the step ST71, it returns to the step ST51 and above-mentioned processes are repeated.

On the other hand, when it is judged that the adjacent cell exists in LTE and the reception quality of WCDMA is not lower than (is higher than) the threshold at the step ST71, i.e. it is judged that the mobile terminal MS has come close to the common base station BS1 for LTE and WCDMA, it proceeds to step ST9.

Then, the periphery cell search of LTE is performed at step ST9, it proceeds to step ST10, and processes subsequent to the step ST10 which are mentioned above are performed. In this way, by performing the periphery cell search of LTE only when the mobile terminal MS is close to the base station BS1 of LTE (and WCDMA), it is possible to further reduce the power consumption.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A wireless station comprising:
 a first wireless communication circuit configured to communicate by a first wireless communication system in a first cell which includes a first service area;
 a second wireless communication circuit configured to communicate by a second wireless communication system in a second cell which includes a second service area narrower than the first service area; and
 a control circuit configured to switch between the first wireless communication system and the second wireless communication system to control communication, wherein
 when switching between the first wireless communication system and the second wireless communication system, the control circuit controls the first wireless communication circuit and the second wireless communication circuit to set an initial communication system which is used before the switching to idle and to maintain the initial communication system at idle without performing disconnection processing thereof while a subsequent communication system which is used after the switching is set to active.

2. The wireless station of claim 1, wherein the control circuit,
 when switching from the first wireless communication system to the second wireless communication system,
 controls the first wireless communication circuit and the second wireless communication circuit so that
 the first wireless communication system is set to idle, the second wireless communication system is set to active, and the second wireless communication circuit communicates by the second wireless communication system, and so that
 a periphery cell search of the first wireless communication system is stopped.

3. The wireless station of claim 2, wherein the control circuit,
 when the wireless station is connected to the second wireless communication system,
 controls the first wireless communication circuit and the second wireless communication circuit so that a keep alive transmission is performed in the first wireless communication system to maintain the first wireless communication system at idle.

4. The wireless station of claim 1, wherein the control circuit,
 when switching from the second wireless communication system to the first wireless communication system,
 controls the first wireless communication circuit and the second wireless communication circuit so that
 the second wireless communication system is set to idle, the first wireless communication system is set to active, and the first wireless communication circuit communicates by the first wireless communication system, and so that
 the second wireless communication system is maintained at idle when a new second cell of the second wireless communication system is found within a first timer period in the second wireless communication system, and a process for out of service is performed when the new second cell of the second wireless communication system is not found.

5. The wireless station of claim 1, wherein the control circuit,
 when the wireless station is connected to the first wireless communication system,
 controls the first wireless communication circuit and the second wireless communication circuit so that
 a periphery cell search is performed at an area out of service of the second wireless communication system or in idle processing when first periphery cell information from another wireless station of the first wireless communication system includes information indicating that the second cell of the second wireless communication system exists in the first cell of the first wireless communication system which is currently connected.

6. The wireless station of claim 5, wherein the control circuit,
 when the wireless station is connected to the first wireless communication system,
 controls the first wireless communication circuit and the second wireless communication circuit so that
 when the first periphery cell information from another wireless station of the first wireless communication system includes information indicating that another wireless station of the second cell of the second wireless communication system exists in the same place as another wireless station of the first cell of the first wireless communication system which is currently connected,
a periphery cell search is performed at an area of out of service of the second wireless communication system or in idle processing, when a receiving signal strength or a carrier to interference and noise ratio for the first cell of the first wireless communication system which is connected satisfies a first criterion.

7. The wireless station of claim 1, wherein the control circuit,
when the wireless station is connected to the second wireless communication system,
controls the first wireless communication circuit and the second wireless communication circuit so that
when second periphery cell information from another wireless station of the second wireless communication system includes information by which a matter is discriminated, the matter being that an adjacent cell which is directly in contact with the second cell of the second wireless communication system which is currently connected, or a neighboring cell which is not directly in contact with the second cell but is located nearby exists,
when there is no adjacent cell to which a handover is possible and the neighboring cell exists with respect to the second cell of the second wireless communication system which is connected, the second wireless communication system which is connected is set to idle and the first wireless communication system is set to active, and
when the neighboring cell does not exist, disconnection processing is performed without the second wireless communication system which is connected being set to idle.

8. The wireless station of claim 7, wherein the control circuit,
when switching from the second wireless communication system to the first wireless communication system,
controls the first wireless communication circuit and the second wireless communication circuit so that
a periphery cell search is performed at an area of out of service of the second wireless communication system or in idle processing when the first periphery cell information from another wireless station of the first wireless communication system includes information indicating that the second cell of the second wireless communication system exists in the first cell of the first wireless communication system which is currently connected.

9. The wireless station of claim 8, wherein the control circuit,
when the wireless station is connected to the first wireless communication system,
controls the first wireless communication circuit and the second wireless communication circuit so that
when the first periphery cell information from another wireless station of the first wireless communication system includes information indicating that another wireless station of the second cell of the second wireless communication system exists in the same place as another wireless station of the first cell of the first wireless communication system which is currently connected,
a periphery cell search is performed at an area of out of service of the second wireless communication system or in idle processing, when a receiving signal strength or a carrier to interference and noise ratio of the first cell of the first wireless communication system which is connected satisfies a first criterion.

10. A semiconductor device comprising:
a first wireless communication circuit configured to communicate by a first wireless communication system in a first cell which includes a first service area;
a second wireless communication circuit configured to communicate by a second wireless communication system in a second cell which includes a second service area narrower than the first service area; and
a control circuit configured to switch between the first wireless communication system and the second wireless communication system to control communication, wherein
when switching between the first wireless communication system and the second wireless communication system, the control circuit controls the first wireless communication circuit and the second wireless communication circuit to set an initial communication system which is used before the switching to idle and to maintain the initial communication system at idle without performing disconnection processing thereof while a subsequent communication system which is used after the switching is set to active.

11. The semiconductor device of claim 10, wherein the control circuit,
when switching from the first wireless communication system to the second wireless communication system,
controls the first wireless communication circuit and the second wireless communication circuit so that
the first wireless communication system is set to idle, the second wireless communication system is set to active, the second wireless communication circuit communicates by the second wireless communication system, and so that
a periphery cell search of the first wireless communication system is stopped.

12. The semiconductor device of claim 10, wherein the control circuit,
when switching from the second wireless communication system to the first wireless communication system,
controls the first wireless communication circuit and the second wireless communication circuit so that
the second wireless communication system is set to idle, and the first wireless communication system is set to active, and the first wireless communication circuit communicates by the first wireless communication system, and so that
the second wireless communication system is maintained at idle when a new second cell of the second wireless communication system is found within a first timer period in the second wireless communication system, and a process for out of service is performed when the new second cell of the second wireless communication system is not found.

13. The semiconductor device of claim 10, wherein the control circuit,
when the wireless station is connected to the first wireless communication system,
controls the first wireless communication circuit and the second wireless communication circuit so that
a periphery cell search is performed at an area of out of service of the second wireless communication system or in idle processing when a first periphery cell information from another wireless station of the first wireless communication system includes information indicating that the second cell of the second wireless communication system exists in the first cell of the first wireless communication system which is currently connected.

14. The semiconductor device of claim 10, wherein the control circuit,
when the wireless station is connected to the second wireless communication system,
controls the first wireless communication circuit and the second wireless communication circuit so that
when the second periphery cell information from another wireless station of the second wireless communication system includes information by which a matter is discriminated, the matter being that an adjacent cell which is directly in contact with the second cell of the second wireless communication system which is currently connected, or a neighboring cell which is not directly in contact with the second cell but is located nearby exists,
when there is no adjacent cell to which a handover is possible and the neighboring cell exists with respect to the second cell of the second wireless communication system which is connected, the second wireless communication system which is connected is set to idle and the first wireless communication system is set to active, and when the neighboring cell does not exist, disconnection processing is performed without the connected second wireless communication system being set to idle.

15. A wireless communication system comprising:
a first wireless station configured to communicate by a first wireless communication system in a first cell which includes a first service area;
a second wireless station configured to communicate by a second wireless communication system in a second cell which includes a second service area narrower than the first service area; and
a third wireless station configured to communicate with the first wireless station or the second wireless station, wherein the third wireless station comprises:
 a first wireless communication circuit configured to communicate by the first wireless communication system;
 a second wireless communication circuit configured to communicate by the second wireless communication system; and
 a control circuit configured to switch a communication system between the first wireless communication system and the second wireless communication system to control communication, wherein when switching between the first wireless communication system and the second wireless communication system, the control circuit controls the first wireless communication circuit and the second wireless communication circuit to set an initial communication system which is used before the switching to idle and to maintain the initial communication system at idle without performing disconnection processing thereof while a subsequent communication system which is used after the switching is set to active.

16. A method for controlling a wireless communication system including a first wireless station configured to communicate by a first wireless communication system in a first cell which includes a first service area, a second wireless station configured to communicate by a second wireless communication system in a second cell which includes a second service area narrower than the first service area, and a third wireless station configured to communicate with either of the first and second wireless stations, the method comprising:
communicating by the third wireless station with either of the first and second wireless stations in accordance with a corresponding one of the first wireless communication system and the second wireless communication system;
when switching between the first wireless communication system and the second wireless communication system, setting an initial communication system which is used before the switching to idle and maintaining the initial communication system at idle without performing disconnection processing thereof while a subsequent communication system which is used after the switching is set to active in the third wireless station.

17. The method of claim 16, comprising, when switching the communication system from the first wireless communication system to the second wireless communication system in the third wireless station:
in the third wireless station, setting the first wireless communication system to idle, and setting the second wireless communication system to active to communicate by the second wireless communication system; and
stopping a periphery cell search of the first wireless communication system.

18. The method of claim 16, comprising, when switching the communication system from the second wireless communication system to the first wireless communication system in the third wireless station:
in the third wireless station, setting the second wireless communication system to idle, and setting the first wireless communication system to active to communicate by the first wireless communication system; and
maintaining the second wireless communication system at idle when a new second cell of the second wireless communication system is found within a first timer period in the second wireless communication system, and performing a process for out of service when the new second cell of the second wireless communication system is not found.

19. The method of claim 16, comprising
when the third wireless station communicates with the first wireless station by the first wireless communication system,
in the third wireless station, performing a periphery cell search at an area of out of service of the second wireless communication system or in idle processing, when a first periphery cell information from another wireless station of the first wireless communication system includes information indicating that the second cell of the second wireless communication system exists in the first cell of the first wireless communication system which is currently connected.

20. The method of claim 16, comprising:
when the third wireless station communicates with the second wireless station by the second wireless communication system,
in the third wireless station, when the second periphery cell information from the second wireless station of the second wireless communication system includes information by which a matter is discriminated, the matter being that an adjacent cell which is directly in contact with the second cell of the second wireless communication system which is currently connected, or a neighboring cell which is not directly in contact with the second cell but is located nearby exists,
when there is no adjacent cell to which a handover is possible and the neighboring cell exists with respect to the second cell of the second wireless communication system which is connected, setting the second wireless communication system which is connected to idle and the first wireless communication system is set to active, and when the neighboring cell does not exist, performing disconnection processing without setting the connected second wireless communication system to idle.

* * * * *